(12) United States Patent
Reiner et al.

(10) Patent No.: US 9,503,412 B1
(45) Date of Patent: Nov. 22, 2016

(54) SYSTEMS AND METHODS FOR IT SERVICES AND SOCIAL KNOWLEDGE MANAGEMENT USING SOCIAL OBJECTS AND ACTIVITY STREAMS

(71) Applicant: ITinvolve, Inc., Houston, TX (US)

(72) Inventors: Rob Reiner, Cypress, TX (US); Michael Sharpe, Katy, TX (US)

(73) Assignee: ITINVOLVE, INC., Houston, TX (US)

( * ) Notice: Subject to any disclaimer, the term of this patent is extended or adjusted under 35 U.S.C. 154(b) by 314 days.

(21) Appl. No.: 13/928,866

(22) Filed: Jun. 27, 2013

Related U.S. Application Data

(60) Provisional application No. 61/665,691, filed on Jun. 28, 2012, provisional application No. 61/673,171, filed on Jul. 18, 2012.

(51) Int. Cl.
| | |
|---|---|
| *G06Q 10/00* | (2012.01) |
| *G06F 7/00* | (2006.01) |
| *G06F 15/16* | (2006.01) |
| *H04L 12/58* | (2006.01) |

(52) U.S. Cl.
CPC ...................................... *H04L 51/32* (2013.01)

(58) Field of Classification Search
CPC ........................................................ H04L 51/32
USPC .......................................................... 709/206
See application file for complete search history.

(56) References Cited

U.S. PATENT DOCUMENTS

| | | | | |
|---|---|---|---|---|
| 5,821,937 A | * | 10/1998 | Tonelli ..................... | H04L 41/12 709/225 |
| 8,751,567 B2 | * | 6/2014 | Chung ......................... | 705/1.1 |
| 2002/0123983 A1 | * | 9/2002 | Riley ...................... | G06Q 10/00 |
| 2003/0144892 A1 | * | 7/2003 | Cowan ................... | G06Q 10/10 706/46 |
| 2009/0132307 A1 | * | 5/2009 | Messer .................. | G06Q 10/10 705/1.1 |
| 2010/0305999 A1 | * | 12/2010 | Fujioka .................. | G06Q 30/02 705/14.45 |
| 2011/0087604 A1 | * | 4/2011 | Chung ................... | G06Q 10/06 705/301 |
| 2011/0125844 A1 | * | 5/2011 | Collier .................... | H04L 12/00 709/204 |
| 2011/0306028 A1 | * | 12/2011 | Galimore ................. | G09B 7/00 434/322 |

(Continued)

OTHER PUBLICATIONS

"Configuration Management Database," Wikipedia, printed Feb. 13, 2012, 3 pgs. at http://en.wikipedia.org/wiki/CMDB.

*Primary Examiner* — Kevin Bates
*Assistant Examiner* — Golam Mahmud
(74) *Attorney, Agent, or Firm* — Sprinkle IP Law Group

(57) ABSTRACT

A system implementing a social paradigm for information technology (IT) services and social knowledge management in an IT environment. Physical and non-physical objects in the IT environment are represented by IT objects which are a type of social objects with social features. Each IT object has an activity stream for capturing communications, notifications, and knowledge related to the IT object. An activity stream manager may detect a change to an IT object, automatically generate a post, topic, or comment about the change, and place it in the activity stream of the IT object. For any IT object affected by the change, the activity stream manager may update an associated activity stream to reflect the change and may notify various users of the update in real time. A user interface is provided for the users to, among others, collaborate in the context of the change.

20 Claims, 33 Drawing Sheets

(56) References Cited

U.S. PATENT DOCUMENTS

| | | | | |
|---|---|---|---|---|
| 2012/0110468 A1* | 5/2012 | Ackermann | ........... | G06Q 10/06 715/747 |
| 2012/0192086 A1* | 7/2012 | Ghods | .................... | G06Q 10/10 715/753 |
| 2012/0221558 A1* | 8/2012 | Byrne | .................... | G06Q 10/06 707/723 |
| 2012/0223951 A1* | 9/2012 | Dunn | ..................... | G06Q 10/10 345/467 |
| 2012/0265808 A1* | 10/2012 | Ezell | ................... | H04L 12/1822 709/204 |
| 2012/0324502 A1* | 12/2012 | Amsterdam | ....... | H04N 21/4314 725/24 |
| 2013/0024462 A1* | 1/2013 | Needham | .......... | G06F 17/30867 707/748 |

* cited by examiner

| FIG. 8A | FIG. 8B |
| FIG. 8C | FIG. 8D |

| Object Details | Activity Stream | Object Relationships | People | Impact Factors |

Basic — 902 | Advanced | Custom Attributes | Components | Environment — 910

Edit | Clone | Apply Template | Create Template | Create Change | Merge | Replace — 920

- Application Name: CAMRY-Exchange
- Short Description: Exchange Infrastructure for California
- Change Template: CHG-277
- External ID: EXCHANGE-002
- Object ID: Application-0000000006
- Owner: Ed Exchange Admin
- Created By: Mike Miller
- Last Modified By: Rob Robert
- Object Type: Application ▶ Tags Tags:

Edit | Clone | Apply Template | Create Template | Create Change | Merge | Replace

| | | | | | 1110 | | |
|---|---|---|---|---|---|---|---|
| Object Details | Activity Stream | Object Relationships | People | Impact Factors | | | |
| Policies | Knowledge | Key Settings 1116 | Management Apps | Automation | Fragile Info | | |

| Name | Description | Value Type | Value | Setting type | Category | Fragile | |
|---|---|---|---|---|---|---|---|
| Exchange PCI key setting | The access to this information must be limited to Group A | String | GROUP A | Permission/Role/Right | | ☑ | ✏ ✗ |
| setting | important | String | Setting String... | Permission/Role/Right | | ☑ | ✏ ✗ |
| SPICE_CONNECT | Required in the EXCH_CONF.XML file to ensure the SPICE MAPI interface initializes properly | String | TRUE | File | | ☐ | ✏ ✗ |
| SPICE_SIM_CON | Located in Exch_out.xml. Controls Spice Simulation and Staging connection. | String | 99999 | File | | ☐ | ✏ ✗ |

1140 — ( Add )

FIG. 11F

| Object Details | Activity Stream | Object Relationships | People | Impact Factors | | |
|---|---|---|---|---|---|---|
| Policies | Knowledge | Key Settings | Management Apps | Automation | Fragile Info ~1119 | ~1110 |

| Name | Description | Value | Setting type | Category | Remove key setting |
|---|---|---|---|---|---|
| setting | important | Setting string.... | Permission/Role/Right | | ✕ |
| Exchange PCI key setting | The access to this information must be limited to Group A | GROUP A | Permission/Role/Right | | ✕ |

FROM FIG. 14A

| | | | | |
|---|---|---|---|---|
| Closed | | | | |
| Priority | 3.- Medium | | Risk | 3.- Low |
| Impact | 1.- High | | External ID | |
| Owner | Mike Miller | | Second External ID | |
| Created By | Mike Miller | | | 2/22/2013 12:07 PM |
| Last Modified By | Mike Miller | | | 2/22/2013 12:07 PM |

▼ Tags

Tags:

▼ Description

Description  Change will accomplish the following
• Upgrade existing dual proc quad core server to quad proc quad core processors
• Upgrade existing 16 GB of Memory to 64 GB memory
• Migrator existing mailstore repository from attached storage array to iSCSI SAN ▼ Additional Email Notification Recipients Publish for Review CC Recipients Submit for Approval CC Recipients ▼ Plan Details Implementation Plan  The following procedure will be used for implementation

RELATED LINKS

Automations (0)
Changes (23)
Knowledge (1)
Policies (0)
Incidents (0)
Problems (0)

CURRENT RELATED CHANGES

Upcoming Changes (0)
In-Progress Changes (0)
Completed Changes (10)

```
Home   My involve ▼   Browse All ▼   Channels   Admin ▼   Service Portal
Changes | CHG-666
```

CHG-666  Change  ╱ 1401
Clone of Upgrade CA Mailstore Server and Storage - Upgrade Processor, Memory, and Storage of CA Mailstore
1420  Status: Published to Stakeholders •

| Change Details | Activity Stream | People | Impact Analysis | Plan | Calendar Plan | Approval Status |

Basic | Change Item ╱ 1424

[Actions for selected items ▼]  🔄 ➕ 📤 🖨 🔍      1426

☐ !  Sort list by: [Change Item Name ▼]  Order: [Ascending ▼]  [Sort]

☐  Connect to iSCSI
   Target Changeset:                    Automatable Task: ☐
   Target Object: CAMRYISCSIP01         Type: Add / Remove
   Target Perspective:                  Status: New
   Connect Mailstore Server to iSCSI SAN ☐  Migrate Mailstore to SAN
   Target Changeset:                    Automatable Task: ☐
   Target Object: CAMRYISCSIP01         Type: Change / Modify
   Target Perspective:                  Status: New
   Copy mailstore from attached array to SAN ☐ ⊶  *Upgrade Memory* ⌇1428  1501
   Target Changeset:                    Automatable Task: ☐
   Target Object: CAMRYMSGMBXP01        Type: Upgrade
   Target Perspective:                  Status: New
   replace existing memory with new memory modules increase memory speed and amount of memory Page 1 of 1 in 3 results          ◁ Previous   Next ▷

John Doe | Settings | Help | Logout |
Advanced Search

Owner ID: Mike Miller
✓ Following ✗
Risk Assessment

1410

| Problems | Incidents | Requests |

Search terms  [Filter]

VITAL STATISTICS

| 2 A High | 0 I | 0 C | 0 P |

CHANGE STATISTICS

3 People following this Change
1 Update in the last 30 days
2 Dependent Objects
5 Dependent Perspectives
2 Associated Alerts
0 Notifications

FROM FIG. 14C

*Estimated Start Date: 8/11/2012 12:15 AM*
*Assignee:* Steve Stevenson
*Estimated End Date: 8/11/2012 12:45 AM*

*Estimated Start Date: 8/11/2012 1:00 AM*
*Assignee:* Ronda Rose
*Estimated End Date: 8/11/2012 3:30 AM*

*Estimated Start Date: 8/11/2012 1:00 AM*
*Assignee:* Ronda Rose
*Estimated End Date: 8/11/2012 1:20 AM*

Page Size: 20

RELATED LINKS

Automations *(0)*
Changes *(23)*
Knowledge *(1)*
Policies *(0)*
Incidents *(0)*
Problems *(0)*

CURRENT RELATED CHANGES

Upcoming Changes *(0)*
In-Progress Changes *(0)*
Completed Changes *(10)*

FIG. 14F

FROM FIG. 14E

Stakeholder Position History

▼ Weigh-in Current Status

| Stakeholder's IT Group | Stakeholder | Impacted Areas | Risk Position | Comments | Created Date |
|---|---|---|---|---|---|
| | Rob Robert | CAMRY-BLDG-A-DC(CAMRYISCSIP01 Exchange(CAMRYMSG MBXP01), CAMRY-BLDG-A-DC(CAMRYMSGMBXP0 1), JR-Camry_Camry_Exchange(CAM RYMSGMBXP01), Exchange SPICE Combined(CAMRYMSG MBXP01) | Accept | I accept the risk. I feel comfortable with this change after looking at the impact to my perspective... | 3/12/2013 5:50 PM |
| | Steve Stevenson | JR-Camny Users(CAMRYMSG MBXP01) | ------ | This comment was automatically added. The associated Stakeholder Configuration has been created. | 2/22/2013 12:07PM |

▼ Old Entries

| Stakeholder's IT Group | Stakeholder | | Risk Position | Comments | Created Date |
|---|---|---|---|---|---|
| | Rob Robert | | | This comment was automatically added. The associated Stakeholder Configuration has been created. | 2/22/2013 12:07PM |

RELATED LINKS

Automations (0)
Changes (23)
Knowledge (1)
Policies (0)
Incidents (0)
Problems (0)

CURRENT RELATED CHANGES

Upcoming Changes (0)
In-Progress Changes (0)
Completed Changes (10)

CHG-666 Change ⟋1401
Clone of Upgrade CA Mailstore Server and Storage - Upgrade Processor, Memory, and Storage of CA Mailstore
Status: Published to Stakeholders •

1430

| Change Details | Activity Stream | People | Impact Analysis | Plan | Calendar P |

💬 Post  ▢ File  🔗 Link  📊 Poll

[Write something...]   [Share]

Sort by: Post Date ▾

Rob Robert has updated his weigh in position for change CHG-666.
Risk Position: Accept
Comment: I accept the risk. I feel comfortable with this change after looking at the impact to my perspective.
👥 Involve • Comment • Like • Today at 5:50 PM

Mike Miller changed Status from New to Published to Stakeholders.
👥 Involve • Comment • Like • February 22, 2013 at 12:08 PM

FIG. 14G

Home  My *involve* ▼  Browse All ▼  Channels  Admin ▼  Service Portal

Incidents | INC-642

⚠ INC-642  Incident ⎯ 1701
My application is Broken
State: Active •
1730

| Incident Details | Activity Stream | Associations | Impact Analysis | Impact Factors | Scheduling |

Post   File   Link   Poll

[Write something...]

Sort by: Post Date ▼

Followers    Show All (2)

Sam Spice Admin
@Mike Miller: Mike, I think we need to fix the Exchange / Spice Connector. Seems it faults if the value is less than 999
• Involve • Comment • Like • February 13, 2014 at 11:57 AM ☒   ⎯ 1774
Promote to Knowledge     ⎯ 1770

⊗ Involve other processes
Attach Involved Link ⎯ 1772

John Doe | Settings | Help | Logout
Advanced Search

1710

Submitted By: Scott Student
⟳ Follow ⊗

Working

VITAL STATISTICS

| 21 | 75 | 0 |
|---|---|---|
| High | High | High |
| A | I | C |

| 0 |
|---|
| P |

INCIDENT STATISTICS

2 People following this Incident
15 Update in the last 30 days
21 Associated Alerts
12 Perspective connections

FROM FIG. 17A

Mike Miller
You need to attach a sprocket to the widget next to the green gadget ASAP
Like • February 15, 2013 at 11:58 AM Write a comment...

Sam Spice Admin
associate incident INC-642 with CAMRY-Exchange
Involve • Comment • Like • February 15, 2013 at 11:51 AM
CAMRY-Exchange

Sam Spice Admin
associate incident INC-642 with SLA BYOD Registration
Involve • Comment • Like • February 15, 2013 at 11:49 AM
BYOD Registration

Sam Spice Admin
associate incident INC-642 with CAMRY-SPICE
Involve • Comment • Like • February 15, 2013 at 11:49 AM
CAMRY-SPICE

RELATED LINKS
Knowledge (0)
Policies (0)
Incidents (75)
Problems (0)
Associated Objects (2)
Associated Changes (0)

SYSTEMS AND METHODS FOR IT SERVICES AND SOCIAL KNOWLEDGE MANAGEMENT USING SOCIAL OBJECTS AND ACTIVITY STREAMS

CROSS-REFERENCE TO RELATED APPLICATIONS

This is a conversion of and claims a benefit of priority from U.S. Provisional Application No. 61/665,691, filed Jun. 28, 2012, entitled "SYSTEM AND METHOD FOR IT CONFIGURATION MANAGEMENT USING SOCIAL METHODOLOGIES" and U.S. Provisional Application No. 61/673,171, filed Jul. 18, 2012, entitled "SYSTEM AND METHOD FOR IT CONFIGURATION MANAGEMENT USING SOCIAL METHODOLOGIES." This application relates to U.S. patent application Ser. No. 13/929,466, filed concurrently herewith, entitled, "SYSTEMS AND METHODS FOR IT SERVICES AND SOCIAL KNOWLEDGE MANAGEMENT USING PERSPECTIVES," which is a conversion of and claims a benefit of priority from U.S. Provisional Application No. 61/665,812, filed Jun. 28, 2012, entitled "SYSTEM AND METHOD FOR IT CONFIGURATION MANAGEMENT USING OBJECT PERSPECTIVES" and U.S. Provisional Application No. 61/673,179, filed Jul. 18, 2012, entitled "SYSTEM AND METHOD FOR IT CONFIGURATION MANAGEMENT USING OBJECT PERSPECTIVES." This application also relates to U.S. patent application Ser. No. 13/753,799, filed Jan. 30, 2013, entitled "SYSTEMS AND METHODS FOR IT SERVICES AND SOCIAL KNOWLEDGE MANAGEMENT USING CHANNELS." All applications listed in this paragraph are fully incorporated by reference herein for all purposes.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

The invention relates generally to information technology (IT) management, and more particularly to the use of social methodologies for communication, collaboration and management of IT objects to facilitate and improve such activities as change management, incident/problem management, helpdesk operations, IT visualization, IT lifecycles, IT task automation, IT reporting, and the like.

BACKGROUND

IT environments generally encompass many objects that are related to each other in some manner. These objects may correspond to both physical entities such as computers and virtual entities such as databases. Managing the objects and their relationships to each other is critical to the smooth operation of any IT environment.

Conventional IT management practices are subject to a number of problems that are common to a wide variety of IT environments. For instance, it is difficult, if not impossible for conventional IT management tools to provide an accurate picture of rapidly evolving IT environments, particularly in the representation of the multiple dependencies and layers of relationships that are typical of any enterprise's IT environment. Consequently, many IT professionals are forced to operate without a complete understanding of their IT environments, and to make decisions that can pose risks to the business operations and reputations of their respective organizations. Further, IT management professionals must spend an inordinate amount of time trying to fix problems that are unintended consequences which result from both routine and emergency changes that occur on a daily basis. Still further, IT management professionals must spend a great deal of time and effort trying to coordinate communications among a vast and diverse group of IT operations staff and other stakeholders who are involved in IT decisions, but conventionally do not have tools to facilitate, record, and learn from the shared experience and knowledge of these IT stakeholders.

Most of the operations management tools used by IT professionals today are not designed to be collaborative, but are instead designed with the attitude that IT management is a relatively closed, closely controlled function that results in isolated "silos" within the IT environment. Further, many conventional solutions such as service desks, configuration management databases (CMDBs), asset management systems, etc. were designed for a previous era, and are missing critical intelligence needed to understand IT environments. These tools were built well before emerging social paradigms existed, and were never intended to exploit the power of collaboration to help capture collective knowledge, improve communication and build rapid alignment around fundamentally better decisions.

Conventional solutions for IT configuration management range from ad-hoc files of information to simple Excel spreadsheets to home grown databases to formal CMDBs. Generally speaking, all these solutions are forms of a database of information about assets. The simple free forms (spreadsheets, text files, etc.) are typically very ad-hoc and hard to maintain. Home grown databases tend to be specific to particular sites, departments or users, and solve one or two pain points adequately, but often do little more than this. These systems tend to be quickly stretched beyond their initial designs and consequently collapse. CMDBs are typically extremely well defined, but are very formal and are rarely implemented and maintained because of the difficulty of inputting the necessary data and keeping it current.

The benefits and disadvantages of a CMDB are well known. Of particular interest in the CMDB case is that the methods by which the data is entered and maintained usually lead to the majority of the data being obsolete. For instance, a vendor that provides the CMDB may install the CMDB and provide manpower to initially input the data, but once the vendor completes this initial data entry, the information in the CMDB may rarely, if ever, be updated to reflect changes in the IT environment.

While IT environments have become increasingly complex, more distributed, and harder to understand with their myriad relationships and dependencies, existing IT management tools have not kept up with these complexities or with the rapid innovation in technology paradigms. CMDBs lack effective ways to capture the power of the collective information that is unstructured within the organization or resident in the collective minds of the employee base.

CMDBs and other conventional tools and systems don't work as well because they fail to provide access to a single up-to-date source of information on physical and virtual devices, policies, people, relationships and knowledge that is necessary to effectively solve many IT challenges. Further, they fail to help users visualize and easily comprehend impacts and risks from multiple diverse and unique vantage points. These tools and systems don't make it substantially easier to get answers, find experts or share information, and they don't facilitate effective collaboration between silos. Conventional tools and systems are very technology-focused and do not capture and utilize the available knowledge of the users who are managing IT infrastructures. Conventional tools and systems do not implement social methodologies with respect to communication and collaboration in the gathering and distribution of information, and consequently fail to harness information that could lead to dramatically more efficient ways to solve companies' daily IT challenges.

SUMMARY OF THE DISCLOSURE

Embodiments disclosed herein provide systems and methods for information technology (IT) services and social knowledge management. The system may include various social features realized through IT objects. IT objects are social objects configured to represent physical (including animate and non-animate objects) and non-physical objects in the IT environment. Social objects are special software objects implementing a social paradigm. Each IT object represents a corresponding physical or non-physical thing, object, item, element, or entity in the IT environment and each IT object has an activity stream for capturing communications, notifications, and knowledge related to the IT object. IT objects may be stored in a data storage device communicatively connected to the system running on one or more server machines.

The system may include an activity stream manager configured for detecting a change to an IT object, automatically generating a post, topic, or comment about the change to the IT object, and placing the post, topic, or comment about the change to the IT object in the activity stream of the IT object. The activity stream manager may follow the relationships that the IT object has with other IT objects in the IT environment and determine what IT objects are affected by the change. For any IT object affected by the change, the activity stream manager may update an associated activity stream to reflect the change and may notify various users of the update in real time. A user interface is provided for the users to, among others, collaborate in the context of the change.

In some embodiments, a method for IT services and social knowledge management may include detecting a change to an IT object. The IT object may have an activity stream configured for capturing communications, notifications, and knowledge related to the IT object. The method may further include automatically generating a post, topic, or comment about the change to the IT object and placing the post, topic, or comment about the change to the IT object in the activity stream of the IT object. The method may include updating various activity streams of IT objects that are related to the first IT and notifying users accordingly.

Embodiments can be implemented as hardware, software programming or some combination. Embodiments can be implemented as computer instructions stored on any appropriate non-transitory computer readable medium known in the art.

Embodiments can provide many advantages. For example, embodiments can provide users with a much more complete, up-to-date, and easily accessible picture of the IT environment and all of the objects contained therein. Further, the fact that every IT object has an activity stream allows very focused, in-context collaboration to occur.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 7 depicts an example data structure for storing attributes of an object type;

Figure 8B:
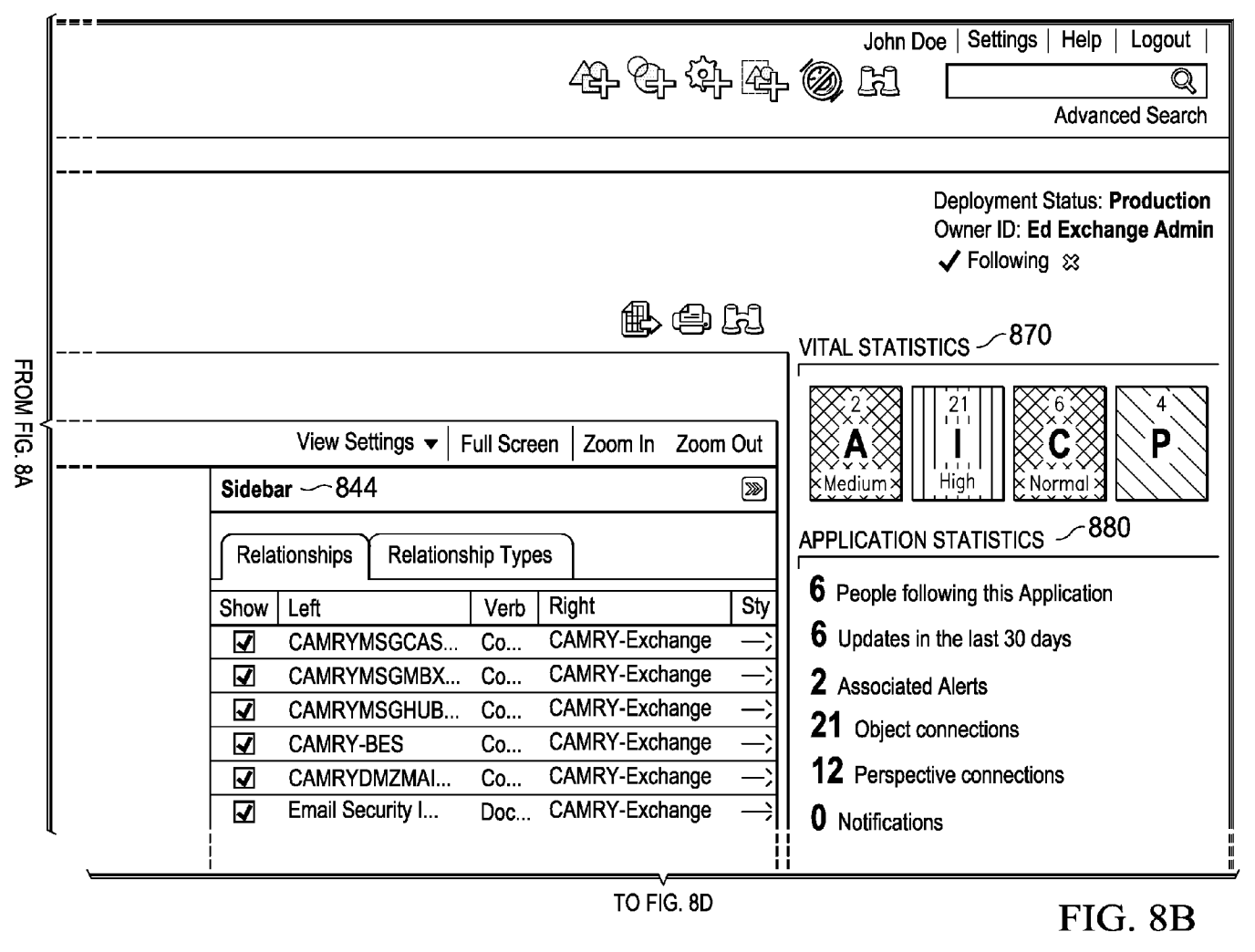

FIGS. 8-11F depict diagrammatic representations of an example user interface of one embodiment of a system implementing a social paradigm for managing an IT environment, the example user interface configured for an application object type;

Figure 12B:
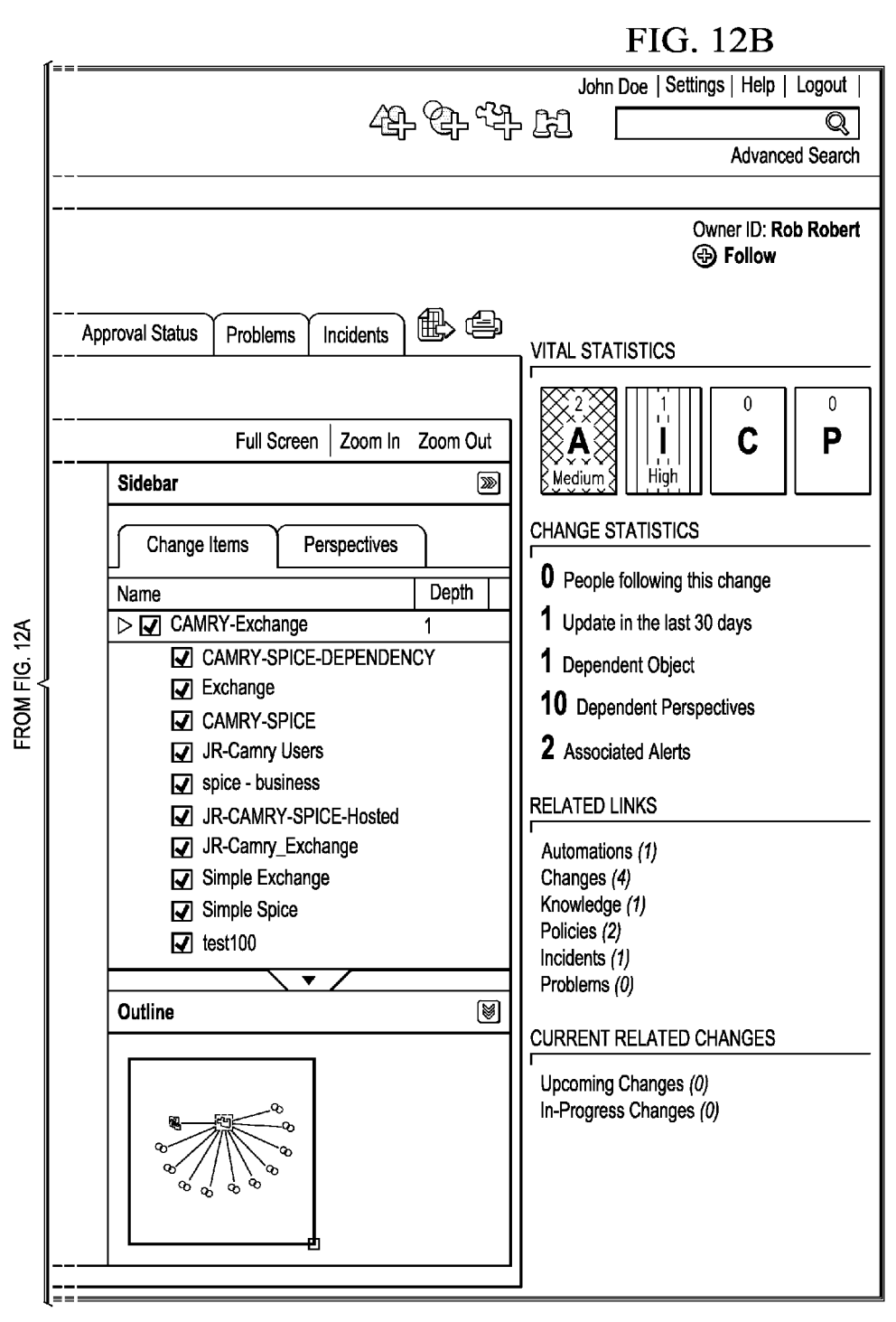

FIGS. 12A and 12B depict a diagrammatic representation of an example user interface configured for a change object type;

FIGS. 14A-14H depict diagrammatic representations of another example user interface configured for a change object type;

FIGS. 17A and 17B depict a diagrammatic representation of an example user interface configured for an incident object type.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk drive, flash drive or other memory), hardware circuitry or the like, or any combination.

Embodiments of an IT management solution disclosed herein include social-media style collaboration features. Through the use of social-media style collaboration and timely and focused communication, people can more effectively and efficiently work together to solve the issues at hand and/or keep abreast of the issues they are involved in.

Before going into specific aspects of the invention, it may be helpful to have a broad understanding of the invention, including a computing environment in which the invention can be implemented.

Figure 1:
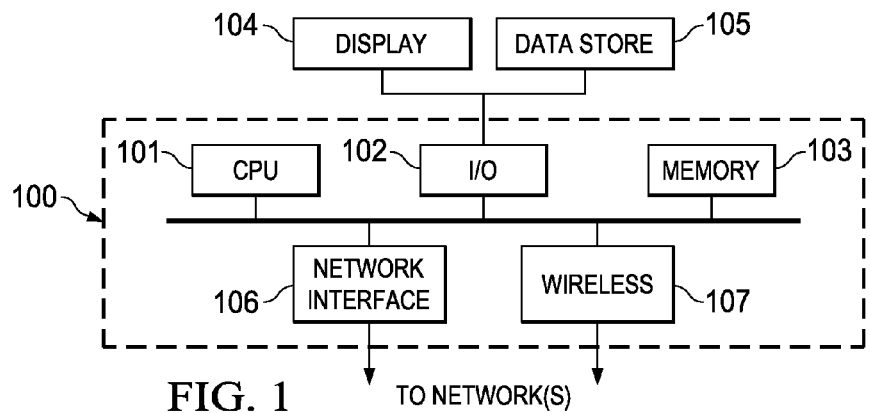
FIG. 1 depicts a functional block diagram of a computing environment in which one embodiment disclosed herein can be implemented.

Referring to FIG. 1, an example computing environment in which the invention can be implemented is shown. As shown in FIG. 1, an example embodiment may employ a computer 100, such as a personal computer or workstation. Computer 100 has one or more processors 101 coupled to one or more user input/output devices 102 (e.g., keyboard and display) and memory devices 103 (e.g., magnetic disk drives, optical disk drives, magnetic cassettes, tape drives, flash memory cards, RAMs, ROMs, smart cards, etc.). The computer can be coupled to a display 104, a data storage device 105 and various peripheral devices 104, such as printers, plotters, speakers, etc. through input/output device 102. The computer may also be coupled to external computers or other devices through a network connection 106, a wireless transceiver 107, or other means that is coupled to a network such as a local area network (LAN), wide area network (WAN), or the Internet.

Those skilled in the relevant art will appreciate that the technology can be implemented or practiced with other computer system configurations, including without limitation multi-processor systems, network PCs, mini-computers, mainframe computers, data processors, and the like. The technology can be embodied in a general purpose computer, or a special purpose computer or data processor that is specifically programmed, configured, or constructed to perform the functions described in detail herein. The technology can also be employed in distributed computing environments, where tasks or modules are performed by remote processing devices, which are linked through a communications network, e.g., a Local Area Network ("LAN"), Wide Area Network ("WAN"), or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips (e.g., EEPROM chips), as well as distributed electronically over the Internet or over other networks (including wireless networks). Those skilled in the relevant art will recognize that portions of the technology may reside on a server computer, while corresponding portions reside on a client computer.

Figure 2:
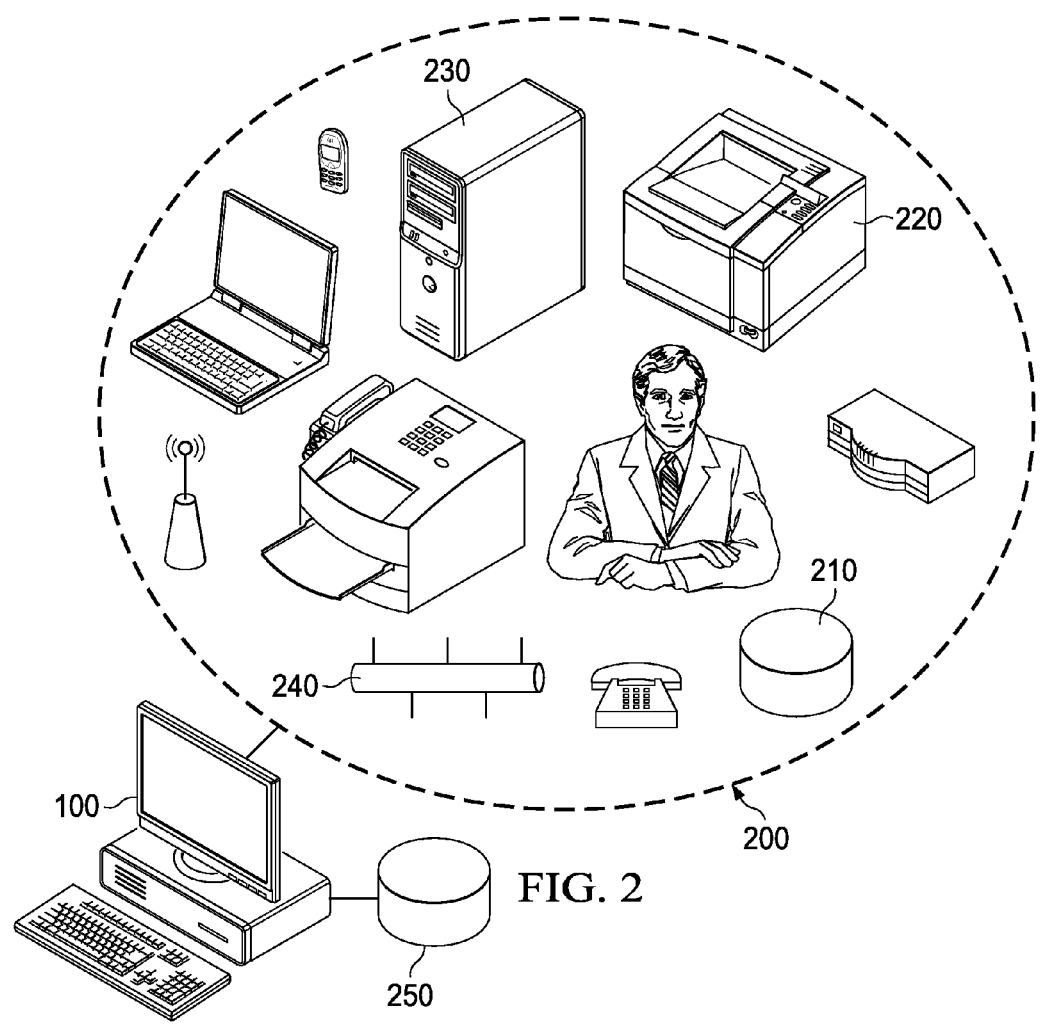
FIG. 2 depicts a diagram illustrating an IT environment.

Referring to FIG. 2, a diagram illustrating an IT environment is shown. In this embodiment, computer 100 resides in IT environment 200, although in other embodiments, computer 100 may be separate from IT environment 200. Computer 100 may be coupled to a variety of other devices in IT environment 200, such as a data storage device 210, a printer 220, a firewall 230, an Ethernet network 240, and other devices. Computer 100 may be coupled to these devices directly or indirectly, physically, logically or through other associations. There may be many other devices within IT environment 200 that are not coupled to computer 100, or the associations between them may be much more distant. IT environment 200 includes a variety of different objects. The objects may include physical objects such as computers, printers, data storage units, and the like, and activities, such as incidents and changes. IT environment 200 may also include non-physical objects, such as permissions, databases, and virtual machines and so on. Such non-physical objects in an IT environment may be referred to as IT objects, which are described in detail below.

In the example of FIG. 2, computer 100 is coupled to a data storage device 250 that is coupled to the computer; either directly or through a network or other suitable data interconnect. Computer 100 and data storage device 250 may be separate from, or contained in IT environment 200. Computer 100 can be configured to execute an IT services and social knowledge management application implementing an IT services and social knowledge management system (referred to hereinafter as the "system" for the sake of brevity). The IT services and social knowledge management application includes program instructions that cause the computer to perform functions that implement a social paradigm. These functions involve, among other things, storage of information associated with objects in the IT environment in the data storage device, as well as retrieval of the stored information. The system running on computer 100 can be configured to enable communications and collaborations (including in-context collaborations, explained below) amongst users in IT environment 200 to facilitate capture of all objects (including physical and non-physical, animate and non-animate items, things, entities, elements, etc.) and relevant information in IT environment 200, and to provide users with a much more complete, up-to-date, and easily accessible picture of the IT environment and all of the objects contained therein. It should be noted that computer 100 and the data storage device coupled thereto may have any suitable configuration or topology, and may be distinct from or encompassed by the IT environment which is being managed.

Figure 3:
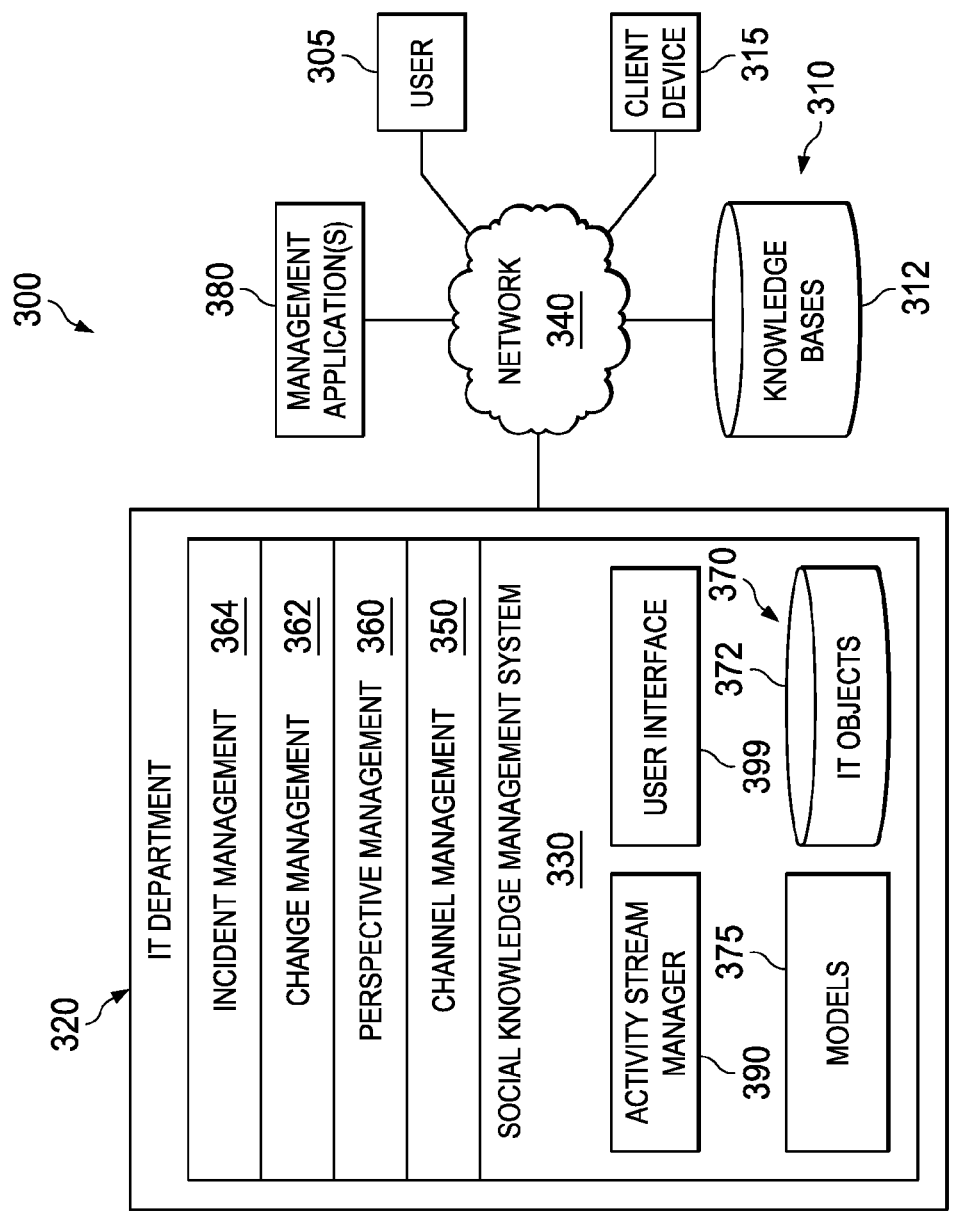
FIG. 3 depicts one embodiment of a system implementing a social paradigm for managing an IT environment.

FIG. 3 depicts one embodiment of a system implementing a social paradigm for managing IT environment 300. IT environment 200 described above can be an example of IT environment 300. In this example, IT environment 300 includes IT department 320 for servicing objects in IT environment 300. As discussed above, in this disclosure, objects in an IT environment can include physical objects (e.g., user 305, data storage device 310, client device 315, etc.) and non-physical objects (e.g., knowledge bases 312, etc.). To this end, IT department 320 may include IT services and social knowledge management system 330 (system 330 hereinafter) having activity stream manager 390 and user interface 399. System 330 may run on one or more computers. Computer 100 described above with reference to FIG. 2 can be an example of a suitable computer.

In this disclosure, "IT services and social knowledge management" broadly covers all aspects of IT operations in an IT environment. For example, system 330 may be configured for the configuration and management of IT objects 372 stored in storage device 370. IT objects 372 may represent physical (including animate and non-animate objects) and non-physical (virtual/digital) objects. Further, system 330 may be configured to perform a plurality of IT management functions (e.g., channel management 350, perspective management 360, change management 362, incident/problem management 364, etc.). A user in IT environment 300 may have access to some or all of the plurality of IT management functions over network 340 via an instance of user interface 399 running on a client device (e.g., client device 315). Ethernet network 240 described above can be an example of network 340.

Figure 4:
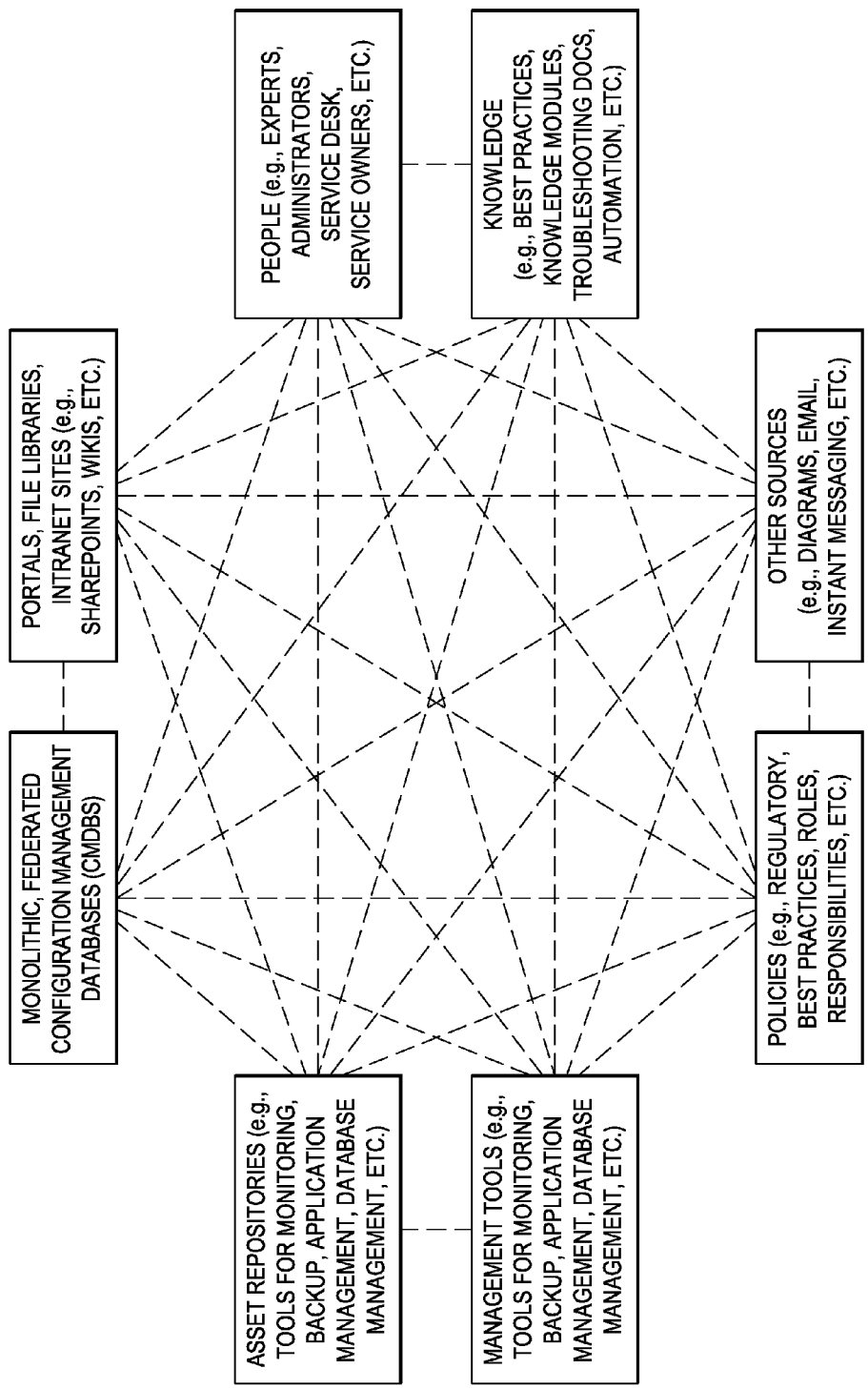
FIG. 4 depicts by example many different types of relationships among different kinds of objects in an IT environment.

Such IT management functions may be implemented on top of or as a part of system 330. Those skilled in the art will appreciate that, although not shown in FIG. 3, additional IT management functions can be created and configured to leverage the features of and advantages provided by system 330. Such advantages can be appreciated with an understanding of the scale, complexity, and challenges involved in IT operations. For example, as illustrated in FIG. 4, an object in an IT environment can have many different types of relationships with many different kinds of objects. It can be very complex and extremely difficult to pinpoint exactly what objects and/or relationships matter to a user or an issue at hand.

Embodiments of a system disclosed herein enables a "divide and conquer" based entry of object information. More specifically, instead of requiring a team of data entry personal to enter an environment's information into a configuration management database (CMDB), actual object owners and other stakeholders who have specific interests in the objects are encouraged to enter and update information about objects that affect their duties. This can eliminate or otherwise reduce entry of data that is wrong, that may be out of date by the time the entry effort is finished, and/or that may go stale very quickly.

The system disclosed herein is unique in several ways. For instance, scenarios are completely new in the field of IT management. A company may have their own internal processes that might already be in place utilizing a conventional CMDB. However, part of the problem of a conventional CMDB is that they may not have the ability to understand the root cause of an incident, the impact of a change to their IT environment, etc. To this end, the system may provide scenarios in conjunction with perspectives (explained below) to enable modeling of a particular group of objects (e.g., models 375). This allows a user of the system to play with what-if scenarios utilizing their internal processes already in place. For example, the user may wish to know "what if a change is made to an exchange email server?" Utilizing perspectives, the system can present to the user all the applications that depend on the exchange email server and show, based on the perspectives, what would happen if that change is made to the exchange email server. Examples of perspectives are provided in the above-referenced U.S. patent application Ser. No. 13/929,466, filed concurrently herewith, entitled, "SYSTEMS AND METHODS FOR IT SERVICES AND SOCIAL KNOWLEDGE MANAGEMENT USING PERSPECTIVES," which is incorporated herein by reference.

Furthermore, the system has a highly "social" focus around each distinct object in an environment and can capture and make use of social knowledge about the object. This is accomplished through the use of what are referred to herein as social objects. Social objects are non-physical objects designed and configured to enable the implementation of social networking paradigms which facilitate the entry and updating of relevant information, as well as the delivery of this information to users who need the information in an efficient, effective, and timely manner.

IT objects are a type of social objects that have features which enable the use of social methodologies in an IT environment. Those skilled in the art will appreciate that other types of social objects may be implemented for different environments and applications, allowing non-animated objects such as a restaurant or telephone pole to, if so desired, have relationships and communicate with people. That is, the invention provides the means for a user to define an object for anything. For example, a user may define an electrical socket as an object in a building or home environment. Accordingly, social objects configured for a manufacturing environment may be referred to as manufacturing objects, social objects configured for a health care environment may be referred to as health care objects, social objects configured for an educational environment may be referred to as education objects, social objects configured for business environment may be referred to as business objects, etc. Other implementations are also possible and anticipated.

Figure 5:
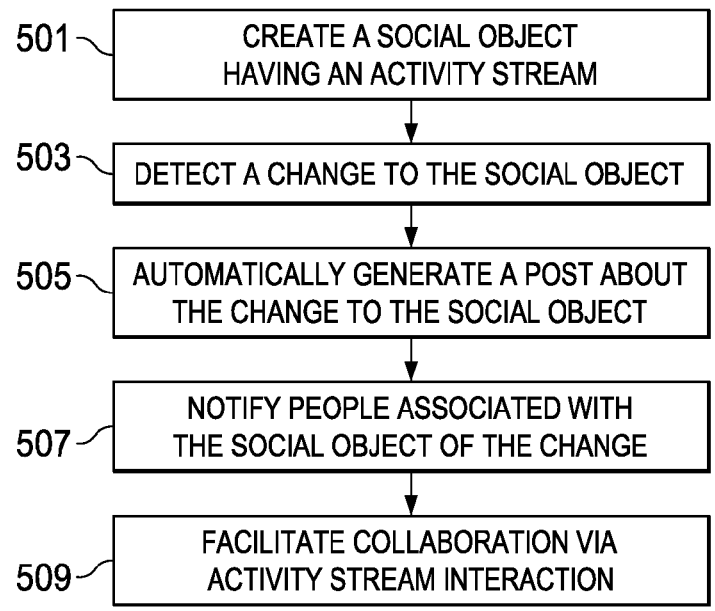
FIG. 5 depicts a flow diagram of one example of an IT services and social knowledge management method implementing a social paradigm.

In some embodiments, as illustrated in FIG. 5, an IT services and social knowledge management method implementing a social paradigm may comprise creating a social object (step 501). One distinct social feature of a social object is referred to herein as an "activity stream," which itself is an object as explained below. The social object may represent any object in an environment where the methodology is implemented. The social object may be changed after it is created. For example, a user may access an interface of the system to change an attribute (e.g., a short description) of the social object. An example of such a user interface is described in detail below. In response to this user action, the system may update a table where the attribute is stored, an example of which is described below.

The method may further include detecting the change to the social object (step 503), automatically generating a post about such a change to the social object (step 505), notifying people associated with the social object (e.g., follower(s), an administrator(s), the social object creator, etc.) of the post about and/or comment(s) on the change (step 507), and facilitating collaboration via activity stream interaction (step 509). A user associated with the social object may be notified of the change via an e-mail, instant message, etc. The user may access the social object (via a user interface of the system), select and view the activity stream of the social object, and comment on the post. Since the activity stream is continuously updated in real time, this allows whoever having a direct relationship with the social object to, if necessary, collaborate on the change almost instantaneously. As explained below, a user can choose to be notified based on the type of the change. For example, a user may not want to be notified if a change to the social object is of an administrative nature and does not require collaboration. This allows the user to filter out changes that are of no or little interest (noises) to the user.

In some embodiments, at least some of the steps described above may be performed by an activity stream manager of the system. In some embodiments, the social object may be an IT object in IT environment 300 and at least some of the steps described above may be performed by activity manager 390 of system 330 shown in FIG. 3. In some embodiments, an activity stream manager may be configured to manage at least the following types of interactions:
  user manipulation of the activity stream;
  automatic field tracking of specific IT objects; and
  automatic cross posting of specific events.

In some embodiments, the activity stream manager may be further configured to manage follower notifications and access to activity streams. The activity stream manager may utilize internal object types to store metadata that the activity stream manager needs to function. More specifically, whenever a user follows an IT object, a user-to-object activity stream mapping is created. These mappings are stored in an internal database table. Whenever an activity stream is updated by a post or a comment to a post, its followers are notified (e.g., via email or desktop client notifications, depending upon each user's notification preferences). Viewing of an activity stream can be done in many ways, including using a user interface, a desktop client, or a mobile client of the system. Since all the posts are already created and associated with appropriate activity streams, viewing is a straightforward process of querying for the posts and comments and rendering them accordingly via the user interface, desktop client, or mobile client of the system.

In some embodiments, on a per object type basis, fields can be marked as significant. When such a field is changed, the activity stream manager creates a post about the change and posts it to the IT object's activity stream. In some embodiments, there can also be a cross-object-mapping which indicates which significant fields are significant to other IT objects also (e.g., an Incident's status is of significance to the Incident's channel, too). The activity stream manager will generate a post for each significant field change based on the cross-object-mapping. Both the track fields per object type and cross-post-mapping can be internal objects in a relational database.

As an example, in some embodiments, an activity stream manager may implementing the following algorithm:
  Wait for an object's field to change
    if (field is tracked) then
      generate post to an activity stream of the object
        if (field is in cross-object-mapping) then
          generate posts on activity streams of other objects based on
      mapping
    Done
  Done In an IT implementation, each IT object has features that encourage and reward collaboration, and these social features are centered on the IT objects, rather than the people who use the system. Another unique feature is that the system can capture all objects which are part of the IT environment, rather than only the physical devices that are present. These objects include physical, virtual and various other objects that surround and support conventional objects which generally are limited to physical devices. In one embodiment, IT objects representing objects that are part of the IT environment are stored in a data storage device accessible by the system.

In some embodiments, the system can be implemented by an application running on one or more server machines in an IT environment (e.g., IT environment 200, IT environment 300, etc.). The system is configured to manage the objects (including physical and non-physical objects) in the IT environment, and to provide a view of the objects in the IT environment that is much more accurate and more comprehensive than can be accomplished using traditional configuration management systems.

In the system disclosed herein, IT objects are considered very generically. Unlike conventional IT management systems, the term "IT object" encompasses more than simply devices in an IT environment. In embodiments disclosed herein, an IT object can be any type of object that has some significance to an IT environment in some way. For example, there can be three categories of objects in one embodiment of a system disclosed herein: objects that represent entities from the IT environment (e.g., computers, networks, incidents, changes, etc.); objects that represent "relationships" between other objects; and internal/support objects that are used to maintain the state of the system, handle the execution of the system behind the scenes, etc.

As to the first category of objects—objects that represent entities from the IT environment—they do not need to be physical objects. They could also be virtual objects. For example, a computer is a physical item—it can be touched, occupies space, and has a location. On the other hand, a "permission" is not physical at all, but is still an important entity in an IT environment which needs management. Interestingly, today many IT entities that have been thought of as "physical" entities now can be entirely virtual, too. For example, computers can be physical objects or virtual entities. These objects are all referred to herein as "IT objects". Within this category of objects, there exist object types which represent specific entities, for example there is a "computer" object type, a "network device" object type, and many other types which represent very specific IT entities. Each of these object types defines and thus is associated with a set of attributes that correspond to the type of entity. There can be other object types that are intended to represent objects that have a very generic set of attributes. Example attributes are provided below.

In this way, any object in an IT environment can be modeled as an IT object and related to other IT objects. For example, the contents of a yellow post-it note stuck to the side of a computer can be captured in an IT object (e.g., as a knowledge object) and then related to the IT object corresponding to the computer via a "documents" relationship. From this point forward, that key piece of knowledge is represented in the system. In this manner, many things which would not typically be considered IT objects can be brought into the system and managed appropriately via specific relationships. This allows the users to capture information which typically considered "tribal knowledge". Another aspect of the object/relationship management and the associated graph traversal logic is that it is very each to see information from both sides of a relationship. For example, when looking at IT object computer X, one might see that it is "governed by" IT object policy Y. While this alone is interesting, the system allows the user to navigate to IT object policy Y, so that the system will show all things governed by policy Y (where policy Y is now the center of the focus). One of these things will be the IT object, computer X. This is an extremely powerful feature.

The second category of objects is relationship objects (i.e., a relationship itself is an object). The objects that represent relationships allow any type of relationship to be defined. This provides a much richer meaning of how objects are related, in addition to the fact that they are related. Specifically, instances of relationships can be defined to relate two specific objects together. For example, the IT object "houfw01" (representing a firewall) could be related to the IT object "housw03" (representing a switch) via a "connected to" relationship. This would mean that houfw01 is connected to housw03. The relationship objects have attributes which specify the two IT objects that are related, the type of the relationship (how they are related), the importance of the relationship, descriptions and a variety of other attributes which are used to render the relationship (line style, color etc.). Relationships can be social IT objects in the system which means relationships can have their own corresponding activity streams. So, when a change is made to a relationship (e.g., from "connected to" to "depends on"), the change can be reflected in that relationship's activity stream as well.

The third category of objects is supporting objects. The objects that are used behind the scenes are all internal objects. They are used by the system to maintain the state of the system, handle the execution of the system behind the scenes, and perform similar functions. These objects are not directly exposed to the end user. As noted above, these objects are referred to as internal/supporting objects.

Referring again to the first category of objects, IT objects, there can be various types. In some embodiments, IT objects can include the following types: physical objects; virtual objects; locations; people; process objects; knowledge objects; and policy objects. Physical objects are tangible objects such as computers, network devices and printers. Virtual objects are any objects that are not tangible, but still need to be managed in some manner. Examples include virtual machines, groupings and permissions. Location objects can be physical or virtual, and typically contain other objects. Examples include sites, rooms, floors, cubicles, buildings, racks, and datacenters. People objects include such things as users, contacts, vendors, manufacturers and groups of users/contacts. Process objects include anything that contains information about processes relating to objects, or which capture the state of something specific to an object. For instance, an incident object could capture the fact that the response time of object X is slow. Examples of process objects include incidents, problems, changes, solutions, workarounds, and tickets. Knowledge objects are objects that capture information about other objects in the system. For instance, a knowledge object could capture the "startup procedures" for a specific database object, or could contain a policy that governs a specific business application. A specific grouping of objects is another type of knowledge object. Policy objects describe policies that govern other objects so that they can, for example, comply with business policies, service level agreements, security postures, etc. There are numerous ways to describe an IT environment. What is actually modeled in a system will depend on the goals of the organization owning and operating the system. As such, the objects needed to model different environments can be wide and varied. Embodiments disclosed herein provide an end user with an ability to extend the objects, particularly the first category of objects described above, in a system and to extend the attributes on any object in the system.

Figure 6:
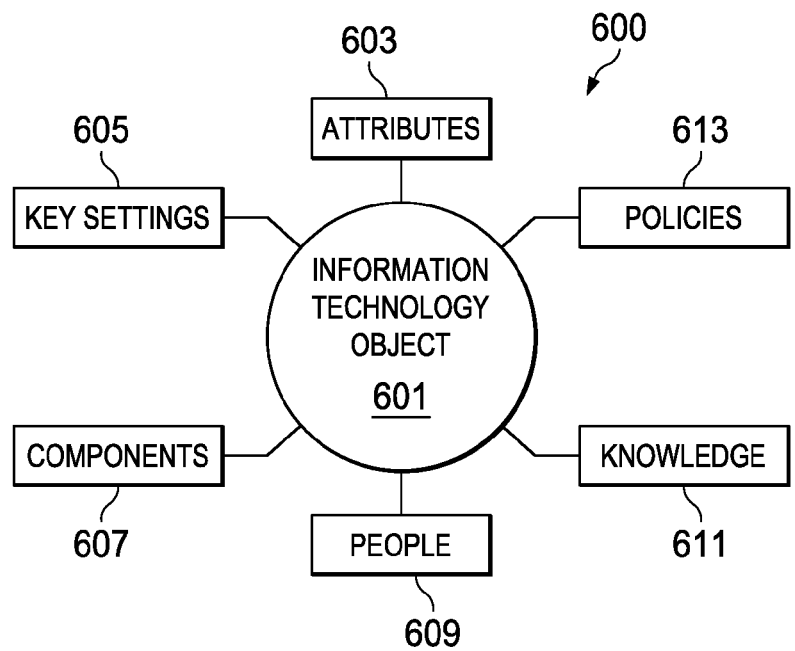
FIG. 6 depicts a diagram illustrating an example object model for IT objects in an IT environment.

As an example, FIG. 6 shows one embodiment of object model 600 for IT objects in an IT environment (e.g., IT environment 200, IT environment 300, etc.). Each IT object 601 has a set of attributes 603 which describe specific parts of the object. Example parts of the object include name, type, description, location, visibility, criticality, etc. In some embodiments, a relational database may be configured to store all IT objects in an IT environment in a persistent manner. Each object type is represented by a table in the database and each object attribute has a corresponding column in the table. Each object instance is represented by a row in the table. Each row has a unique identification (ID) which is the primary key and uniquely identifies each object instance. An example table is illustrated in FIG. 7.

Figures 7, 8:
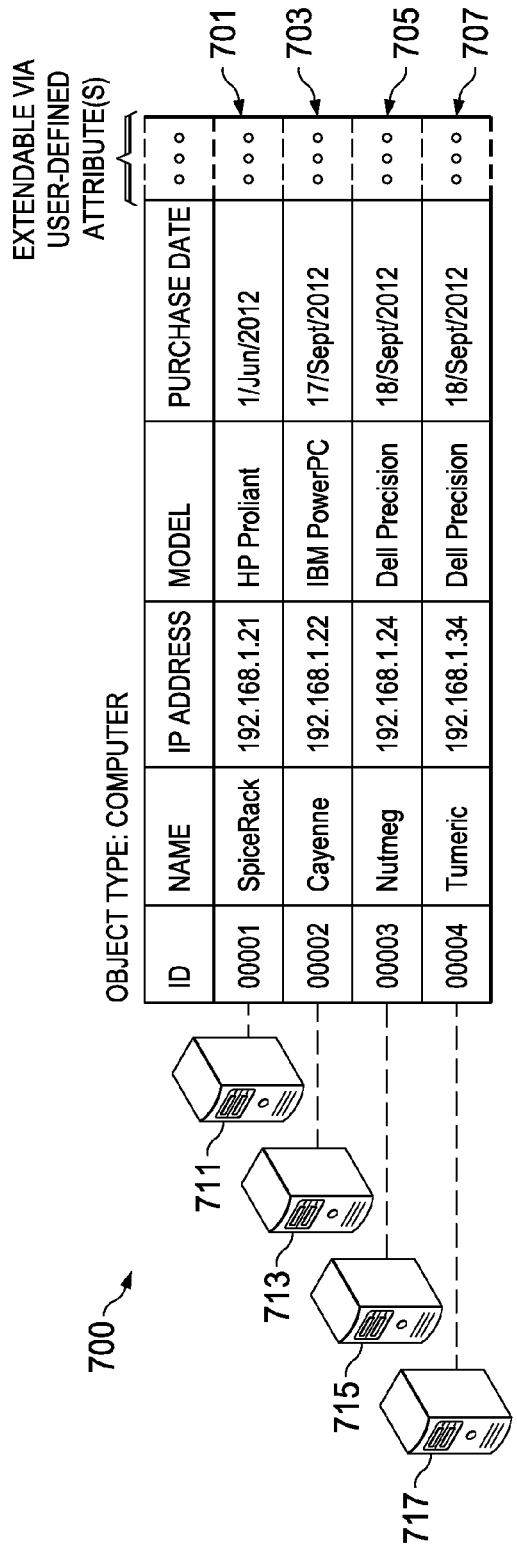
Figure 8A:
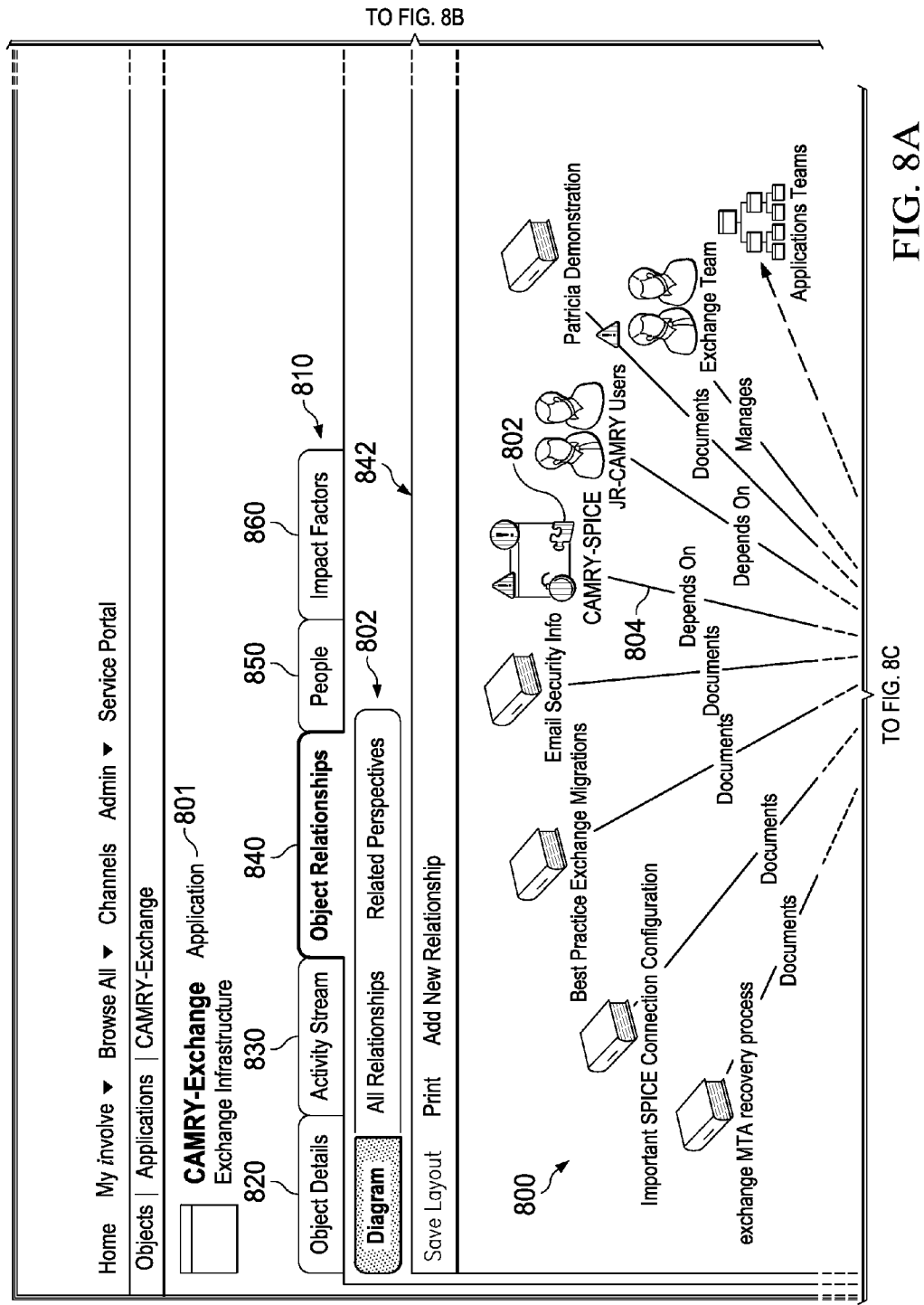
Figure 8C:
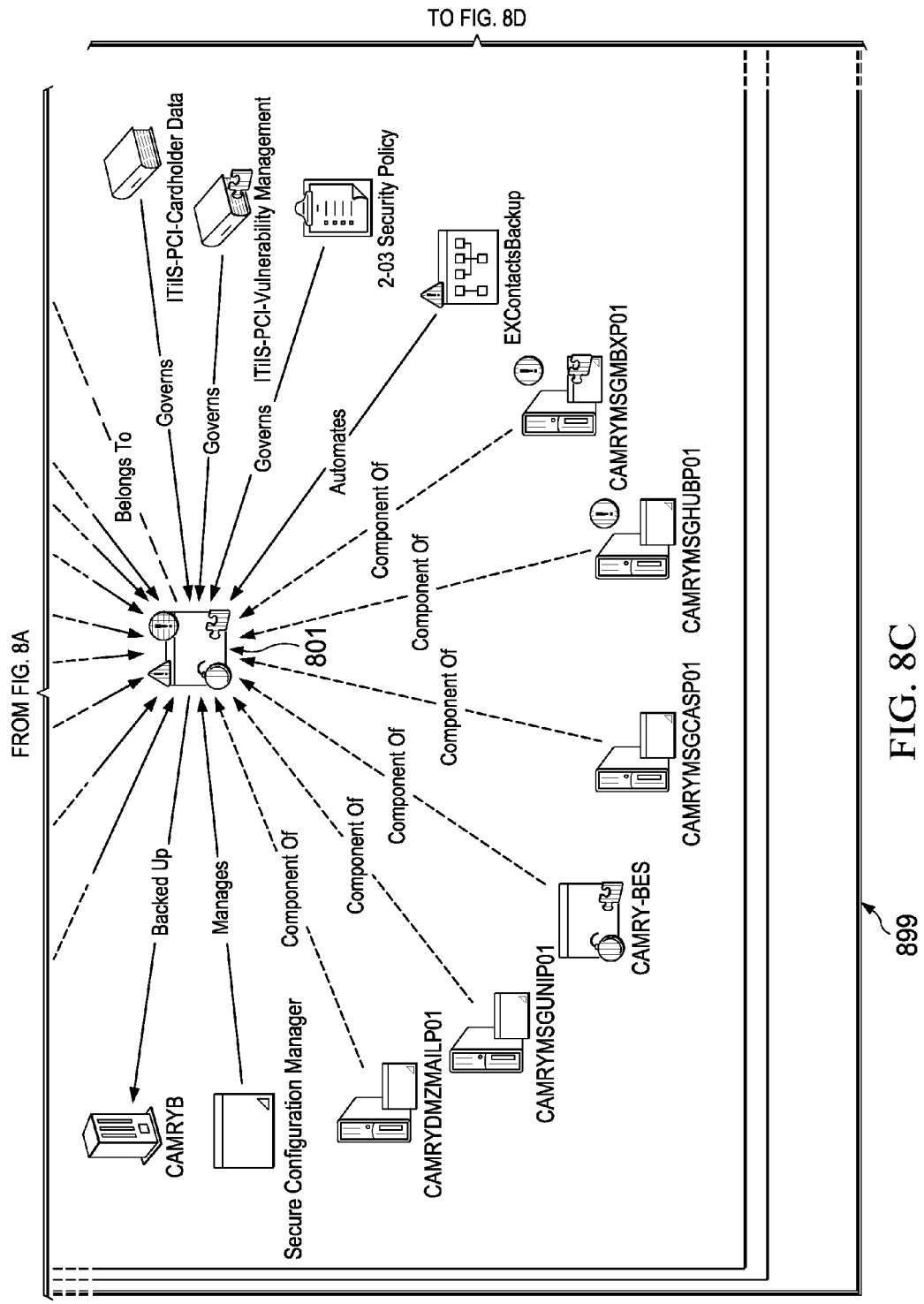
Figure 8D:
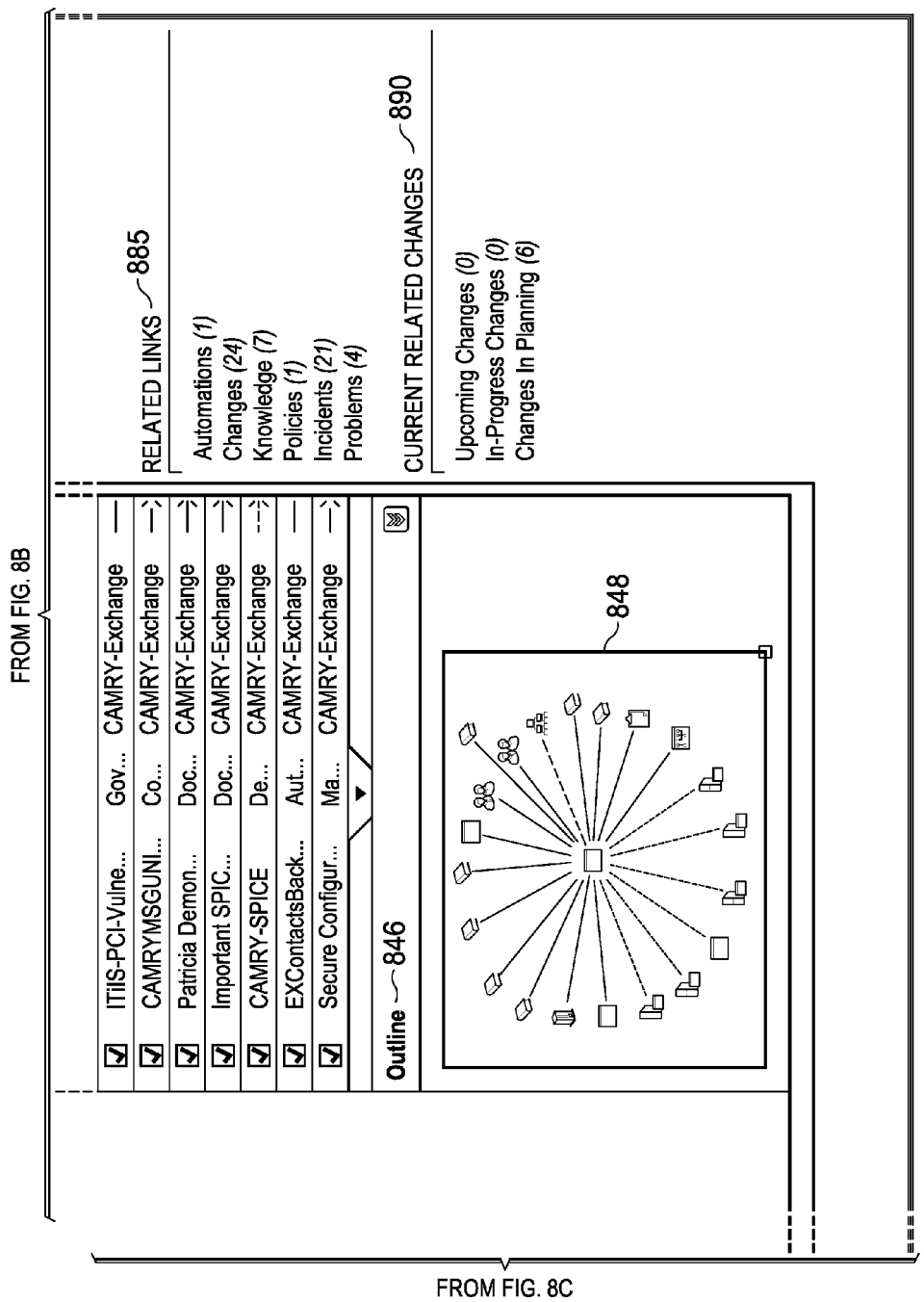

In FIG. 7, table 700 is configured for a computer object type. Attributes are listed in columns of table 700, including "Name," "IP Address," "Model," "Purchase Date," and numerous other attributes (not shown). In some embodiments, table 700 can allow user-defined attributes be added, for instance, by extending column(s) of table 700. Each row in the object table representing an instance of the computer object type having the set of attributes. In this example, table 700 shows four object instances, identified by their respective unique ID, with IT object 701 representing computer 711, IT object 703 representing computer 713, IT object 705 representing computer 715, and IT object 707 representing computer 717.

Some IT objects are linked to other IT objects. For example, Computer X "is connected to" Computer Y and Computer X's "model is" Model A. In such examples, the ID of the one type of object is an attribute of another. The primary key of one object in another table is called a foreign key. For example, in a relationship object type table, the "Left" and "Right" attributes are foreign keys referring to other objects. In the computer object type table shown in FIG. 7, the "Model" attribute is a foreign key referring to a row in a model object type table (not shown).

In this disclosure, attributes of an object form its "profile". Every object can have some common persona attributes, like "Name", "Description", "Deployment Status", etc. However, specific attributes are determined based on the type of the object. For example, a network object and an incident object may have different sets of attributes. Some attributes may be predefined as defaults and some may be user-defined custom attributes. In some cases, when specific key attributes (explained below) are set, the time is recorded, along with the attribute values.

Returning to FIG. 6, IT object 601 may be associated with components 607 such as application tiers, core services, processes and the like in an IT environment. As a specific example, for an IT object representing a computer, a random access memory may be a component of the computer. People 609 such as experts, administrators, service owners, and so on may be those who are directly involved with IT object 601. In this context, people 609 does not include "followers"—those who follow IT object 601 but are not directly involved in IT object 601 itself. For example, an administrator assigned to an IT object representing an email server may be one of its people (represented as a people object). A user following the email server may be notified when the status of the mail server has changed, but the user is not listed as one of its people.

IT objects 601 may also be associated with knowledge 611 and policies 613. Examples of knowledge 611 that may be associated with IT objects 601 may include documents, discussions, frequently asked questions (FAQs), fragile settings, management applications, etc. For example, a user manual for a computer may be a knowledge object relating to the computer object. Further, an IT object may relate to multiple knowledge bases such as an internal wiki page, an external reference site, a vendor's knowledge base, etc. Examples of policies 613 that may be associated with IT objects 601 may include regulatory policies, best practice policies, roles and responsibilities in the IT environment, etc. Key settings 605 may be stored in files, registries, and database tables. A key setting may reflect knowledge that is not coded. For example, a user may enter a key setting for a computer object, stating that the operating system running on the computer should not be automatically updated because a software application running on the computer only works with the particular version of the operating system.

Key settings can be placed on knowledge objects and policy objects and pushed to everything linked to such objects.

As discussed above, each IT object has an associated activity stream which captures communications, notifications and other pieces of knowledge related to the object. Because the activity stream allows users of the system to collaborate with each other in regard to the IT object, the activity stream may also be referred to as a collaboration stream. This and other features of IT objects are described below. In embodiments disclosed herein, IT objects can include some or all of the features described below.

- Each IT object has a "Name" and an "Owner". The owner can be an individual person or a group of people in an environment implementing a system disclosed herein.
- Each IT object has a "profile" or "persona" and a set of "metrics" which indicate the completeness of the profile. The profile can be thought of as all the attributes specific to a particular IT object. In this disclosure, attributes could be more than just name-value pairs. For example, attributes can include relationships to other objects, whether the object is used or referenced, etc.
- Each IT object has an "activity stream" which is an area where topics, comments, and the like can be posted. In some embodiments, the content of the activity stream would be in the context of some aspect of the particular IT object. When an IT object is created (as an object instance of an object type), a corresponding software object is instantiated as an activity stream for the IT object from a predefined class having a set of attributes. The set of attributes for the activity stream may include an activity stream name and a foreign key of the object instance which owns the activity stream. This internal/supporting object is not a social object (i.e., there is not an activity stream for an activity stream). It can be a database object with state attributes mostly internal to the system. Since there is a one-to-one relationship between a social object and an activity stream, the same is true for an IT object and its activity stream. As discussed above, an activity stream manager may be configured to manage these activity streams.
- Each IT object has a "status". In some embodiments, this can be a message indicating something special about the IT object. For example, "Going offline for regular maintenance soon" could be a status message.
- In some embodiments, topics and comments on an activity stream can be "rated". The rating allows users to provide feedback on high quality topics/comments and also allows users to find high quality topics/comments. The "rating" or the like feature can also provide immediate feedback as to how many people actually view the topic/comment in some capacity and got something out of it.
- In some embodiments, users and groups in the system can collect "badges" by interacting with the IT objects. Badges can be acquired by meeting specific pre-defined goals (e.g., a "first comment" badge could be awarded the first time a user comments on something. A "50+ comment" badge could be awarded when a user comments on something 50 times). Badges could also be awarded on a group basis also to encourage competition between groups. All areas of object management could be eligible for the awarding of badges (e.g., setting 50+ attributes, updating more than 100 objects, etc.). Some badges could be awarded on a discretionary basis (e.g., one use could award another user a "You made my day" badge for providing some timely help, or a manager could award a "team player" or "super star" badge to recognize good work).
- In some embodiments, a "promote to knowledge" function (see, e.g., FIGS. 17A-17B) is provided to enable specific topics and comments from activity streams to be converted into formal knowledge objects within the system. Such knowledge objects are handled in the same manner as other IT objects.
- In some embodiments, the system may have the ability to make "automatic comments" and/or "posts" on IT objects. This may occur when related IT objects are updated in ways that affect other IT objects. The automatic comment would be posted to the activity streams of other related IT objects automatically. For example, if object X is related to object Y, then object X's activity stream would receive a new topic indicating that object Y is related and vice versa. As another example, if a "change" is planned to object Z, then object Z's activity stream would receive notifications. In some embodiments, activity stream posts are represented by a "Post" object type and have attributes including a foreign key of the activity stream to which the post belongs, content of the post, attachments to the post (foreign key), date of the post, and various other attributes about the post for maintaining the internal state. In some embodiments, activity stream comments on a post are represented by a "Comment" object type and have attributes including a foreign key of the activity stream to which the comment belongs, content of the comment, attachments to the comment, date of the comment, author of the comment (foreign key), and various other attributes about the comment for maintaining the internal state.
- Each IT object has "followers", or interested users. An IT object owner is one follower, but any other user in the system can follow the IT object. When an IT object is followed, each follower receives updates about new topics/comments that occur with respect to the IT object that they follow.
- Each IT object can be related to other IT objects. For example, object X might be "connected to" object Y, in which case object X and Y are considered "friends" of each other. There can be different types of relationships between two IT objects. For example, one IT object may be managed by another IT object. As another example, a computer object may depend on an application object.
- In some embodiments, IT objects and activity stream topics/comments can be "tagged". Tagging is a community driven mechanism for categorizing knowledge in some manner.
- In some embodiments, each user can create a "favorites" list that allows them to accumulate the IT objects that are important to them. This concept is generalized to allow each user to create a variety of lists. For example, an "important" list might hold the IT objects that are critical to the environment from a user's point of view, or a list called "Fred's objects" might represent the IT objects a user oversees from another user named "Fred", etc.
- "Personalization" features allow the system to alert specific users about various things based on the behavior of other users. For example, a user who is a member of the "help desk" group may be alerted to the presence of other object based on what other members of the "help desk" group viewed or manipulated.

"Location awareness" features take advantage of the capability of knowing where IT objects are by making correlations concerning this information. For example, if a change request exists for object X and object Y, and these objects are known to exist in data center Z, the system can identify administrator(s) at data center Z to perform the change.

In some embodiments, "temporal" information is also maintained for each IT object. For example, "creation time", "last update" time, times when comments are made, etc. can be automatically tracked and stored.

In some embodiments, "news items" containing important announcements that could affect all users of the system can be posted. Some new topics can be automatically created by the system. News items can be related to specific IT objects as well.

These unique features of IT objects provide a working foundation for many unique features of the system:

In-Context Collaboration and Rating.

The activity stream associated with each IT object is one of the many unique features of the system. The activity stream can be a set of supporting objects which maintain the state of the conversation. This allows topics to be created and comments on topics to be entered in relation to each IT object. The fact that every IT object has an activity stream allows very focused, in-context collaboration to occur. Each topic or comment can be rated. In one embodiment, two types of rating are possible. The first is a like/dislike mechanism. Each comment or topic can be liked by a user or disliked by a user. A running count of the number of likes and dislike votes is maintained. Each user can only like/dislike something once. A second option is a star rating mechanism. In this case, each topic or comment can be rated by the user via a simple star system. One star would indicate it is a poor quality topic/comment, while 5 stars would indicate a high quality topic/comment. No stars would indicate that the topic/comment is not rated. The actual star rating is shown next to the comment. Each user can only contribute one vote to a star rating, but it is possible change the vote. The overall rating of the topic/comment is determined by the averaging the number of star given by all the voting users. Ratings can be used to search for popular or high quality comments within an activity stream. Other types of rating mechanisms may also be possible.

User Activity Reward.

The activities of each user can be tracked when they are manipulating IT objects. The information collected via tracking can be used to implement a reward-based badging system. Some examples of what may be tracked include: comments added to an objects activity stream; topics created on an activity stream; the number of IT objects created by type; and the number of IT objected edited by type. This information can be used to award "badges" to users once thresholds are met. For example, if a user creates 25 computer objects, he or she may earn the "Silver Computer Creator" badge. If the user creates 100 computer objects, he or she may earn the "Gold Computer Creator" badge. The actual badges which can be awarded and the criteria that the badges are award for is defined by users of the system who have the power to create badges (e.g., admins and managers).

Direct Knowledge Promotion.

Another feature of the activity streams associated with IT objects is that topics and comments can be "promoted to knowledge". There are times when the information provided in the collaboration which occurs in the activity stream will be deemed so useful that it will be promoted to knowledge. When this occurs, an IT object of type "knowledge" is instantiated and the content of the topic from the activity stream is stored in the knowledge object instance. The user who promoted the knowledge is given the opportunity to provide more information, give the knowledge a name, etc. Once the promotion is complete, the knowledge object is automatically related to the IT object which owns the activity stream. At that point, the new knowledge IT object is part of the universe of all objects and can be related to other objects in the same manner as any other IT object.

System Generated Topics/Posts/Comments.

The activity stream contains not only user comments, but also automatic topics/posts/comments. When certain events occur in the system, the system will automatically generate and add topics/posts/comments to the activity streams of those IT objects involved with the event. Some examples of events which trigger automatic topics/comments include the following.

Relationship creation: recall that when two IT objects A and B are related, a relationship object is created. When this relationship object is created, the system posts a comments to A's activity stream indicating B is related and, conversely, a comment will be posted on B's activity stream indicating that A is related. The information about the type of relationship created is also included.

Follow/Unfollow operations: whenever someone follows/unfollows an IT object, an automatic comment is sent to the object's activity stream to notify the followers of the operation.

Setting attribute values of an IT object: specific attributes in an IT object can be tracked. When a tracked attribute is modified, an automatic topic/comment is posted to the object's activity stream.

Domain Specific Operations: there are a number of IT objects in the system which provide for higher level features beyond the base level management, manipulation and visualization of the objects in an IT environment. These objects are also IT objects, but tend to exist based on the fact that other IT objects exist. Some examples of these IT objects include: meaningful collections of IT objects; changes/change items which are IT objects that manage changes to other IT objects; problems/incidents, which are IT objects for managing issues which affect other IT objects; and channels, which are IT objects for managing the change control process of other IT objects. Aspects and examples of channels are described in the above-referenced U.S. patent application Ser. No. 13/753,799, filed Jan. 30, 2013, entitled "SYSTEMS AND METHODS FOR IT SERVICES AND SOCIAL KNOWLEDGE MANAGEMENT USING CHANNELS," which is incorporated herein by reference.

When higher-level objects are created and then bound or related to other IT objects, the activity stream of both objects are updated to indicate the higher level operation. For example, when a "change item" A focusing on IT object X is created on change M, then the activity stream of M is updated via an automatic topic/comment to indicate a change item was added to the change. Further, the activity stream of object X is updated to indicate that is part of change M and change item A.

There is no limit to the types of automatic topic/posts/comments which can occur. Essentially, whenever the internal state of the data changes, an automatic topic/post/comment could be posted to an activity stream.

Humans as Social Objects.

One of the IT objects in the system is the "user". In an IT environment, users of the system are typically the IT staff, and the members of the IT staff are a very key part of any IT environment. For each user of the system, there is a corresponding IT object to represent the user. There may also be IT objects to represent groups of users. Given that the system is aware of these objects, not only can the reward/badge system track personal achievements, but group achievements as well.

Locations as Social Objects.

Another feature of the system is that locations are treated as IT objects. Just as other types of IT objects can be related to each other, IT objects can be related to locations. Further, since each user and each contact is also an IT object, location information can be maintained about the people in the IT environment. This location information can be exploited when manipulating various IT objects. For example, it makes little sense to assign a change which requires physical access to an IT object to someone who is not near the IT object. Location information can therefore be used to identify a user who is near the relevant location. The location information becomes even more useful when GPS data from mobile devices can also be used. Task scheduling can be optimized by exploiting the locations of IT staff when tasks are assigned.

Personalization.

Another social feature involves personalization. In this disclosure, personalization is the process of collecting information about users and combining that information with data collected from other users to be able to intelligently offer suggestions to the user based on the behavior of other similar users. Consider a simple scenario in which user X updates an attribute Y of object Z. Later, another user M updates an attribute of object P, which is similar to object Z or even related to object Z, either directly or transitively. The system might offer to set attribute Y on object P to the same value as object Z. The determination as to whether the suggestion is made would consider various factors, such as the similarity of the objects, the manner in which they are connected, and the IT objects to which they are connected. The similarity of the two users (whether they both work in the same group, for instance) may also be considered. The features of the attribute could also be considered. For example, it would not make sense to offer the suggestion for a name attribute, as those values are typically unique. It might be reasonable, however, to assume that two similar objects in the same room might share the same administrator, rack or key settings.

Follower Notification.

In this disclosure, any IT object can be "followed". When a user follows an object, he or she will receive notifications when any activity occurs in the IT object's activity stream. The notifications can be received in various ways, such as via email, via a desktop client which is capable of viewing all followed activity streams, via a web activity stream viewer, or via the user's home page when logging in to the system. An object that is followed can be "unfollowed" as well. When an IT object is unfollowed, notifications to the user resulting from changes to the activity stream will stop.

Tagging.

Tagging is another social feature which can be implemented in the system. A tag is a label that is associated with an IT object in the system. The tag can be created by a user as a way for the user to easily find the object again in the future. Tags can be any text string. A tag might be used to indicate an IT object is part of some application (e.g., an object could be tagged with "payroll system"), or that an IT object is having issues (e.g., could be tagged with "busted"), etc. Objects can be searched for and organized using tags. Over time, tags defined by users of the system can form a community-built ad-hoc index for IT objects in the system.

News.

The "news" feature is another social feature in the system. News items can be created and published. When news articles are published, they are categorized by topic using a predefined set of categories. News items are presented to the user if the category of the news item matches a predefined news filter of the user. Each news item can also be associated with an IT object, and that association can also be used as a filtering mechanism in each user's news filter. Some categories of new article are always made available to the user. For example, new items indicating information about the status of the system itself or any new item which has an "emergency" type of category may always be presented to the users. News items could contain information about events coming up in the IT environment, or details about a major change to a specific object. The news may be presented to the user in several places. For example, a news ticker may be used to slowly scroll the new topics matching a user's filter across each page of the user interface. There may also be a dedicated portion of the of the user interface that will display the list of news items and allow the user to read the news items in full.

Collateral Information.

In addition to having social features, the IT objects in this disclosure enable types of information that are not conventionally stored in a CMDB to be associated with the objects. These types of collateral information can include, for example, documentation about the object, documentation about how to manage the object, best practices, information about backup/recovery, disaster recovery, etc. Any documentation that is pertinent to the IT object can be related to the object. Another type of collateral information is policy Information which affects the object. Key settings that are important to the object or that are fragile may be associated with an object. These settings would typically be those settings that could affect the security or compliance posture for the object in question, or specific steps on how to perform an action based on specific relationships of the object, or specific configurations that are sensitive to performance or availability impacts. Automations that are used to manage an IT object may be associated with the object. These are things like backup scripts, monitoring applications/scripts etc. This includes information which is maintained by the owner of the object and which is often lost when the owner leaves his or her role due to attrition, transfer, promotion, etc.

Collateral information may also include ownership and management assignments relating to the object. This type of information may capture, for example, the person responsible for the object, the person who is assigned the object, the IT group who manage the object, or the department to which the object belongs. Another type of collateral information is notes that are specific to an actual instance of an IT object. Providing note-type information is akin to placing a yellow post-it note on the side of a machine with an important tidbit of information. Management Apps related to an object are another type of collateral information. Management Apps information for an object could indicate, for instance, the particular performance management tool that is used to monitor the performance of the object. By capturing this type of information, IT users can quickly understand how management products are related to objects in the IT environment.

As mentioned above, the IT objects in this disclosure are social objects which have features that enable the use of social methodologies. Specifically, each IT object has an associated activity stream which captures communications, notifications and other pieces of knowledge related to the object. The activity stream allows users of the system to collaborate with each other in context relative to the object which, in one embodiment, includes all of the features described above.

The system allows users to create IT objects and Relationships. When a number of IT objects and Relationships have been created, a graph can be formed. The Objects are nodes in the graph and the relationships are links in the graph. The graph typically becomes a single connected graph over time, but this is not required. Initially, the graph would likely contain a number of disconnected islands and, as more objects and relationships are defined, the islands would merge into larger components. The graph which is formed may be referred to as a "Small World" graph. In this type of graph, object X will have some number of related objects. Each of these objects may have some number of related objects. Each object may therefore be directly related to one set of objects, related via a single degree of separation to another set, and so on. For example, if computer X is connected to router Y, and router Y is connected to network Z, computer X is connected to network X via a single degree of separation through router Y.

In embodiments disclosed herein, users of the system may interact with and/or have access to these and other features via a user interface. For example, referring to FIG. 3, user 305 of system 330 may interact with and/or have access to at least some of the features described above using a browser running an instance of user interface 399 on client device 315. The system may allow a user to start with any object and see all the objects that are related to that object. The user can then drill down on any related object, and the objects related to that can be seen. This provides a mechanism for the user to traverse the graph that represents the IT environment. One example of a suitable user interface will now be described in detail with reference to FIG. 8-12.

FIG. 8 depicts a diagrammatic representation of an example user interface (divided into FIGS. 8A-8D) of one embodiment of a system implementing a social paradigm for managing an IT environment. The system may include a plurality of modules implementing a plurality of functions including IT operations management functions. IT objects of different object types in the system may be supported by different sets of functions, at least a portion of which can be visualized on a user interface of the system. For example, user interface 899 may operate to present a plurality of tabs 810 for IT object 801. In this example, IT object 801 represents an application called "CAMRY-Exchange" in IT environment 800. Other IT objects having the same object type as IT object 801 may be visualized in the same or similar manner.

The system may federate information from disparate sources, including an external network security monitoring system (e.g., management application 380 shown in FIG. 3), analyze objects such as physical and virtual devices, business services, policies, and people, determine their relationships, and so on, and provide users, via user interface (e.g., user interface 899 shown in FIG. 8, divided into FIGS. 8A-8D), with a relevant view of an underlying IT environment (e.g., IT environment 800). This gives users a holistic tool that can profile the IT environment and make related knowledge available in one place, so that assessment, collaboration, decisions and reporting with respect to the IT environment can be based on accurate, timely, and shared understanding across the IT environment. This approach for building collective intelligence provides IT staff more value than conventional configuration management systems without adding to their administrative burden.

In one embodiment, the system allows each object to be understood and visualized from multiple vantage points. In other words, each object can be visualized in relation to other objects and individuals. User interface 899 of FIG. 8 (divided into FIGS. 8A-8D), for example, depicts IT object 801 at the center of diagram or layout 842. The selected object (e.g., IT object 801) is surrounded by all of the objects (e.g., IT object 802) to which it is related, and the relationships (e.g., relationship 804) between the selected object and the related objects are depicted. This allows users to see links and dependencies between one object and other, related objects throughout the IT environment. The interface allows users to drill down by selecting one of the related objects (e.g., IT object 802), which then becomes the central object in the display, with all of its related objects (including previously selected IT object 801) surrounding it.

In the example of FIG. 8 (divided into FIGS. 8A-8D), tabs 810 include object details 820 (see FIGS. 9A-9B and FIG. 10A), activity stream 830 (see FIG. 10B), object relationships 840, people 850, and impact factors 860 (see FIGS. 11A-11F). Each tab of tabs 810 may have an associated module (e.g., an activity stream manager) configured to perform a particular function for the object type. For example, in one embodiment, activity stream 830 may be associated with activity stream manager 390 of system 330 shown in FIG. 3.

In one embodiment, each IT object in IT environment 800 may have additional information such as statistics and related links that are specific to the IT object itself. For example, user interface 899 may further include informational navigation elements such as vital statistics 870, application (because IT object 801 is of an application object type) statistics 880, related links 885, and current related changes 890. Such informational navigation elements may provide additional insights on the IT object—a summary of things that are active in the system and particular to the IT object—as well as a means to quickly and directly navigate to those items of information relevant to the IT object. For example, vital statistics 870 may include statistics for alert (A), incidents (I), changes (C), and problems (P) specific to IT object 801. In some embodiments, an alert may be generated by a management solution (e.g., management application 380) communicatively connected to the system (e.g., system 330). Such an alert may include an alert identifier (ID), a description (e.g., a text string), and a target object and be provided by the management application through a web service to the system. The system may include a generic application programming interface (API). The alert is passed through the API to the activity stream manager. In one embodiment, the activity stream manager determines the target object (in this case, IT object 801) and inserts the alert in the activity stream of the target object without modifying the alert. In one embodiment, the system may be communicatively connected to multiple external management or monitoring applications via a single, generic API. This allows integration with other systems and let external messages, notifications, alerts, and the like to be passed along and into the activity streams of IT objects of interest.

Referring again to FIG. 8 (divided into FIGS. 8A-8D), object relationships 840 provides a topographical view of IT object 801 and all of its relationships with other IT objects in IT environment 800. In one embodiment, this topographical view is constructed by the system at the back end and rendered in real time on user interface 899 by a browser application running on a client device.

In addition to the topographical view, object relationships 840 may include various menu items 802, sidebar 844, and outline 846. Sidebar 844 may show relationships between various objects and IT object 801 "CAMRY-Exchange" and how they are related (relationship types). For instance, a server machine called "CAMRY-SPIKE" represented by IT object 802 has a relationship with IT object 801 as it "depends" on "CAMRY-Exchange" represented by IT object 801. Relationship object 804 between IT object 801 and IT object 802 is visualized in diagram 842 and listed in text under sidebar 848. For the sake of brevity, relationship objects are referred to as relationships from now on. The topographical view shown in diagram 842 can be changed by selecting from menu items 802 or manipulating thumbnail 848 under outline 846 to zoom in on a portion of diagram 842 or zoom out to see an overview.

Figure 9B:
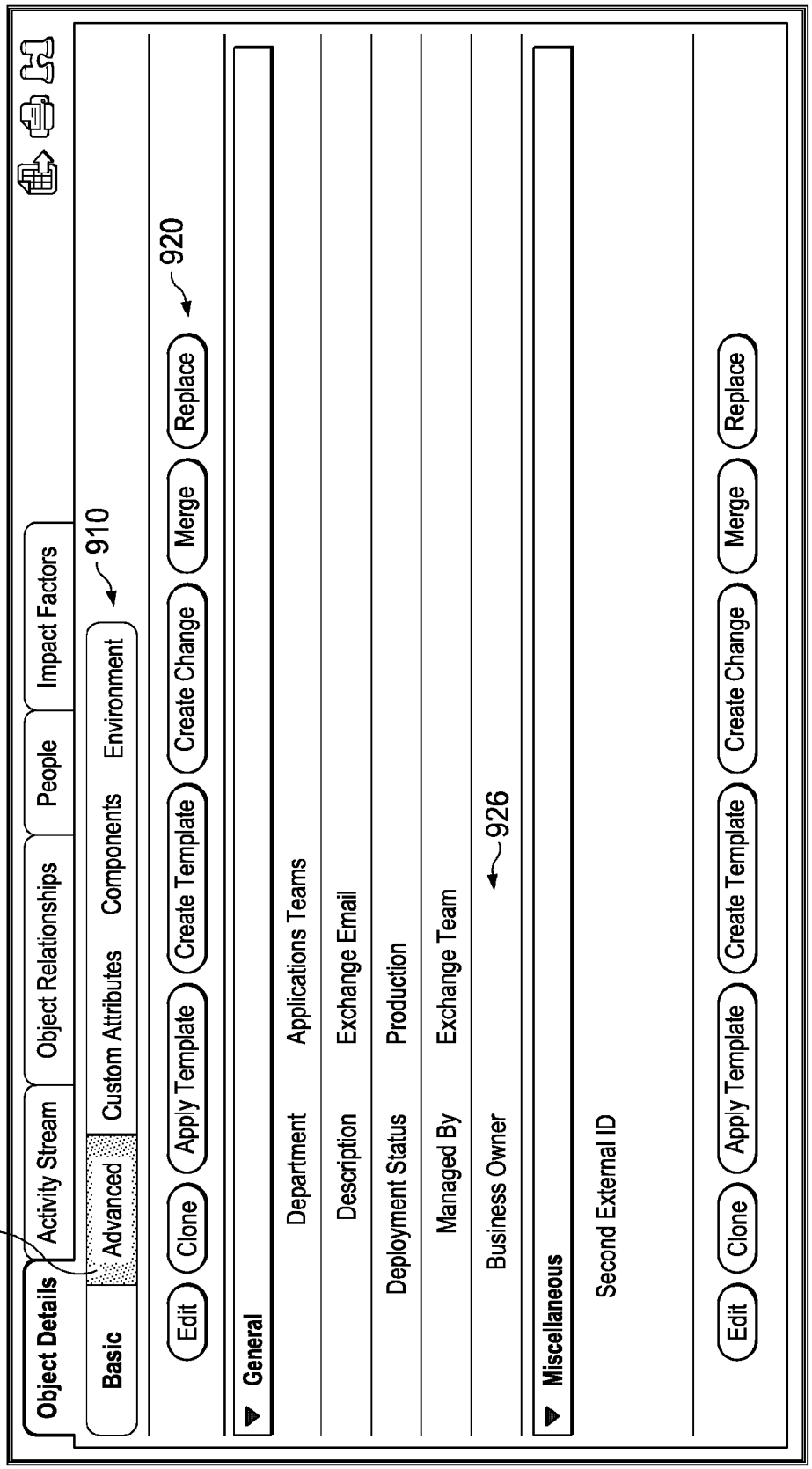
Figure 9C:
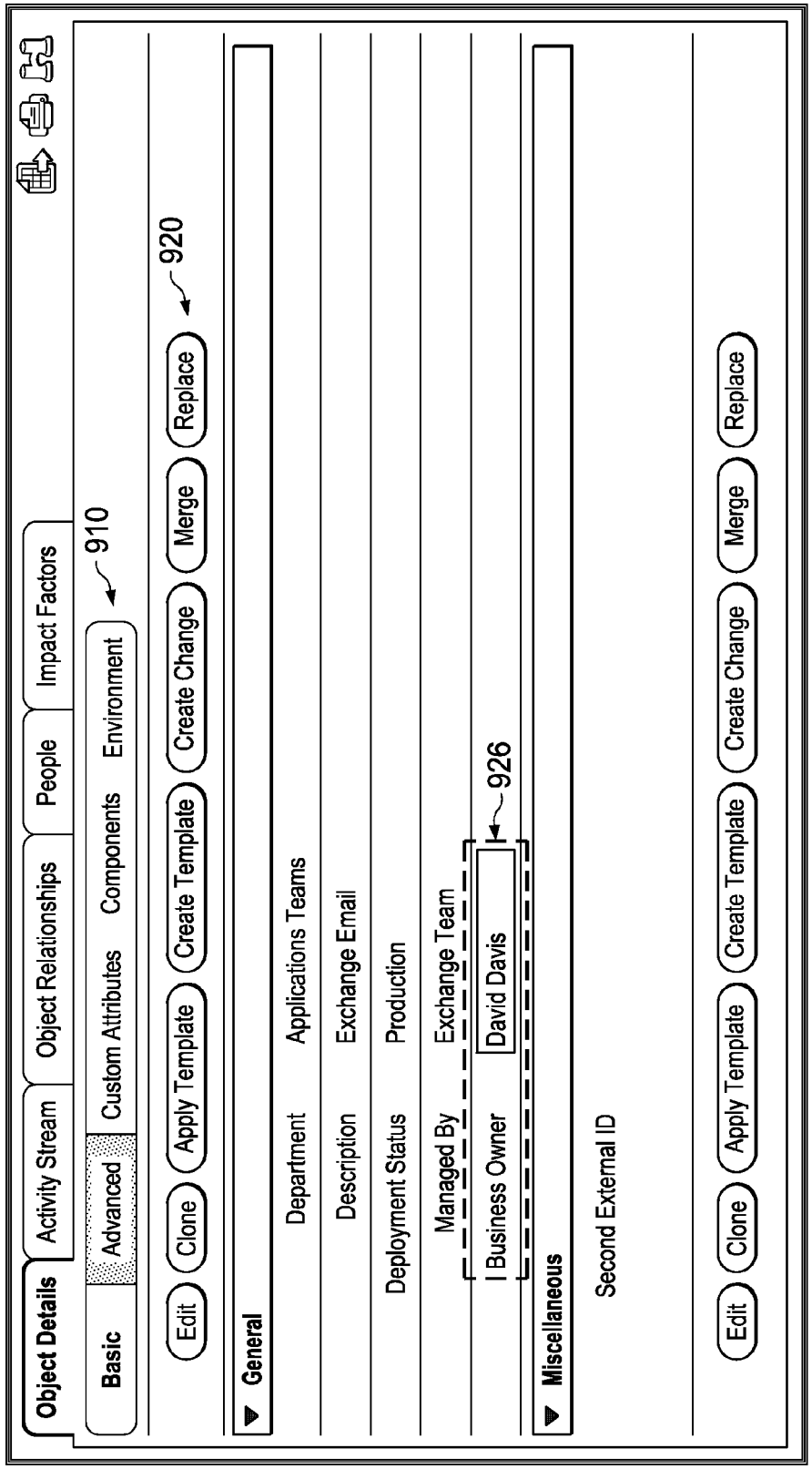
Figure 11A:
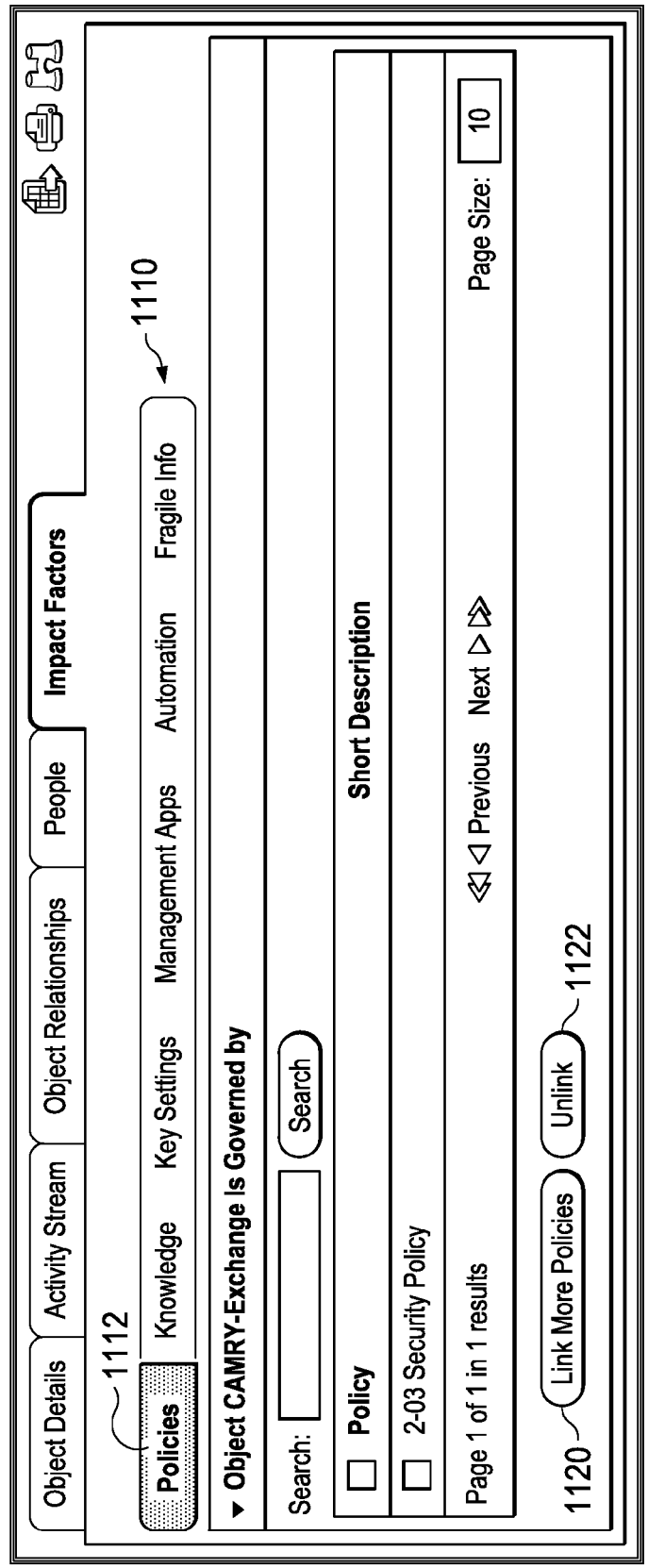
Figure 11B:
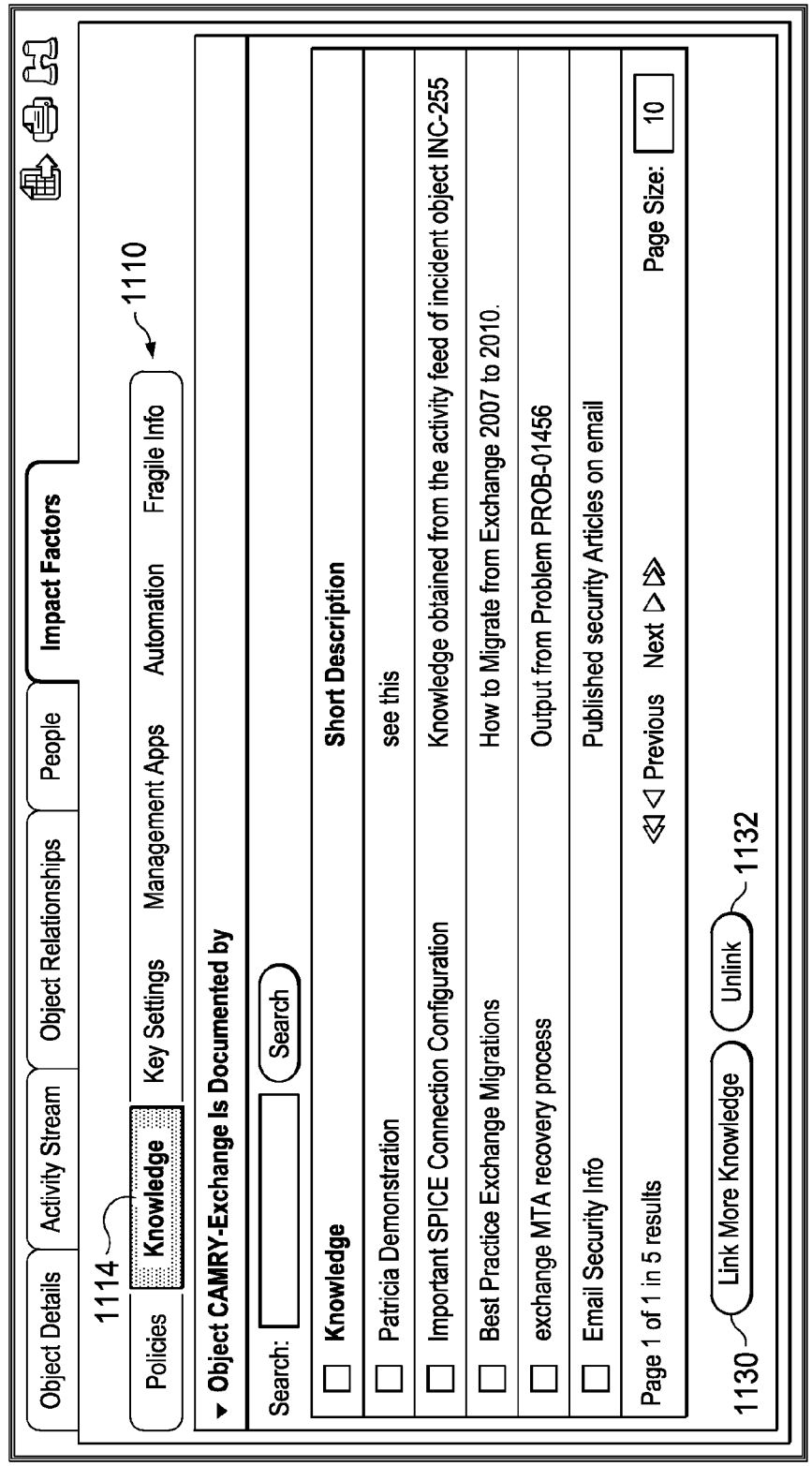
Figure 11D:
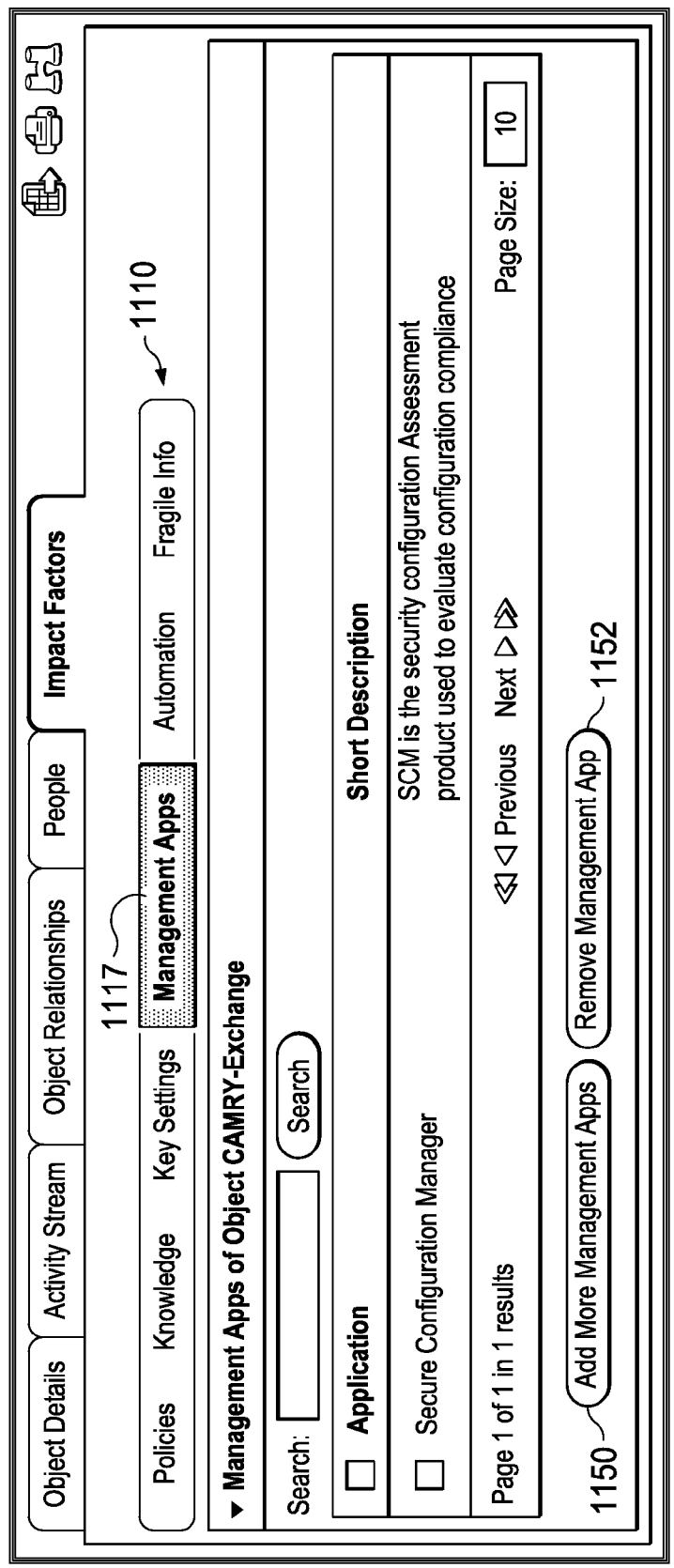
Figure 11E:
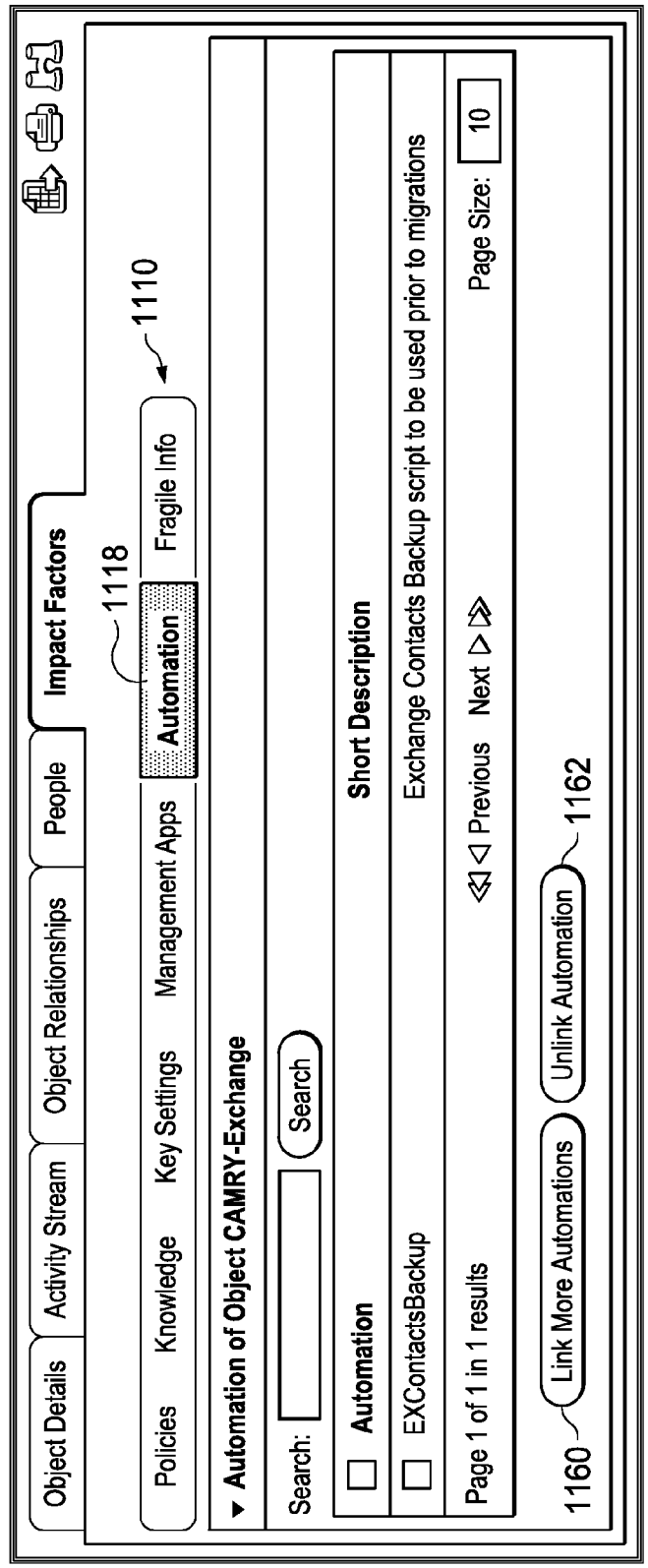
Figure 12A:
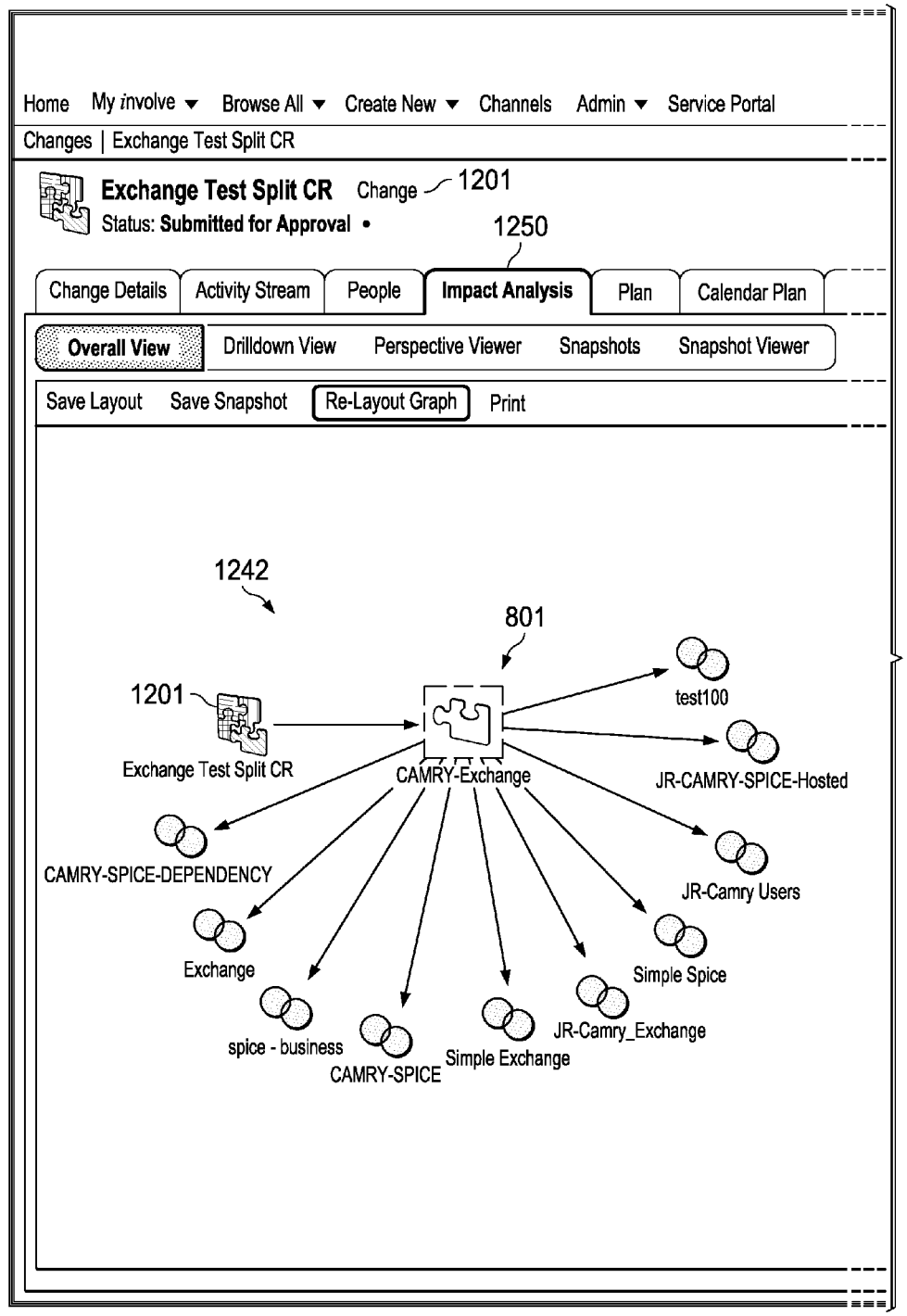

FIGS. 9A, 9B, and 9C each depicts a diagrammatic representation of a view of an object details tab (e.g., tab 820 shown in FIG. 8 (divided into FIGS. 8A-8D)). Under this tab, there can be a plurality of menu items 910 and a plurality of functions 920. Menu items 910 may include basic object details 902 (see FIG. 9A) and advanced object details (FIG. 9B) describing various parts of a selected object (e.g., IT object 801 of FIG. 8 (divided into FIGS. 8A-8D)). Basic object details 902 may include a set of basic object attributes such as name, short description, object ID, owner, creator, "last modified by," and object type. Advanced object details 904 may include a set of advanced object attributes such as department, deployment status, "managed by," and business owner. These object attributes can be manipulated using any of the plurality of functions 920 and additional information about the selected object may be accessed via menu items 910.

Figure 10:
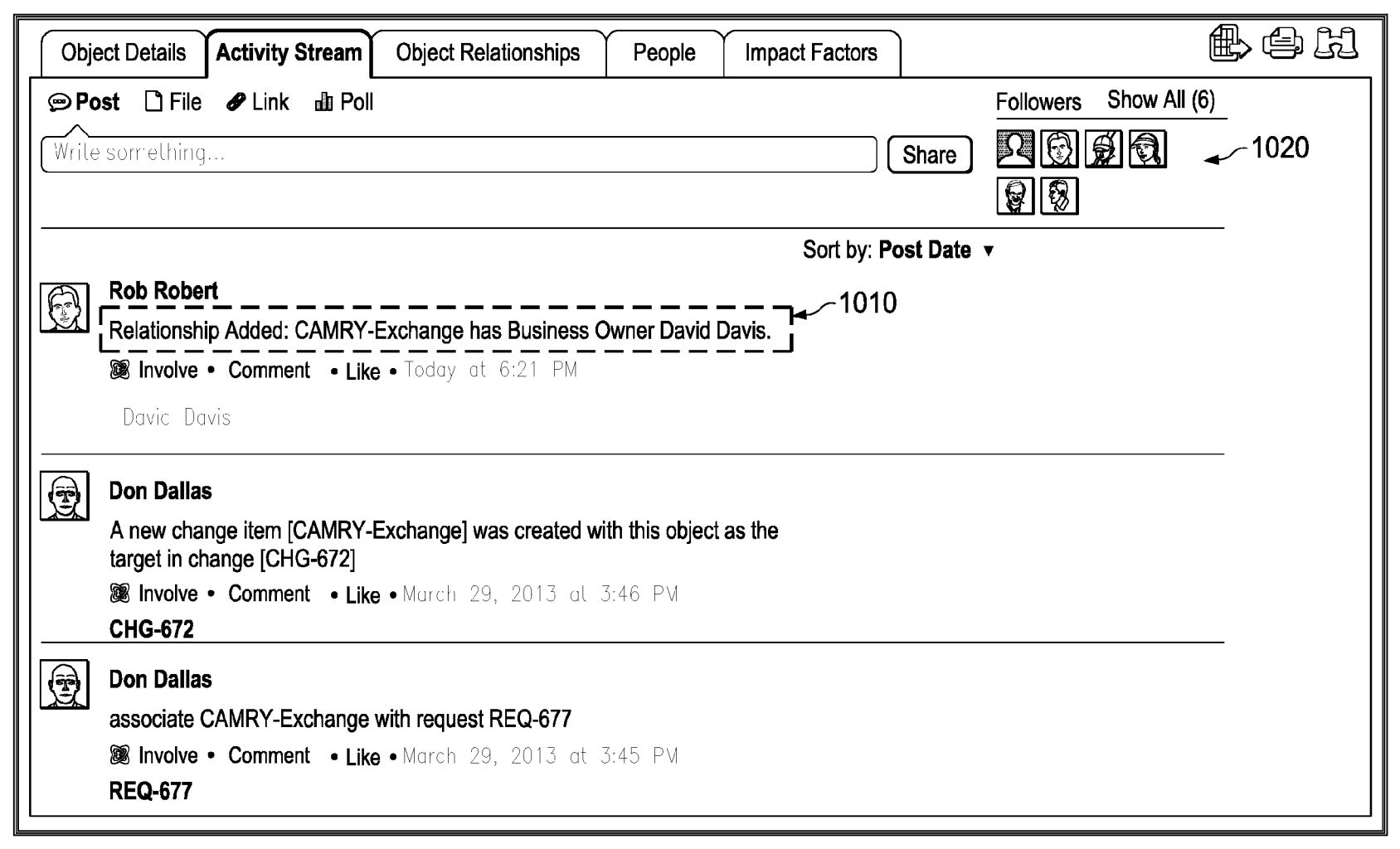

In FIG. 9B, a value for an object attribute "Business Owner" has not been entered (e.g., "Business Owner" attribute field 926 is blank). A user may log into the system and updates the attribute "Business Owner" with a value of "David Davis." A corresponding object table (see e.g., FIG. 7) is updated with this value in a column corresponding to the attribute "Business Owner" and the "CAMRY-Exchange" object now has a relationship with the "David Davis" object. FIG. 9C shows an update to "Business Owner" attribute field 926. FIG. 10 depicts a diagrammatic representation of a view of an activity stream tab (e.g., activity stream 830 shown in FIG. 8 (divided into FIGS. 8A-8D)), which shows automatically generated post 1010 reflecting this update. As explained above, all followers 1020 of the selected object (e.g., IT object 801 of FIG. 8 (divided into FIGS. 8A-8D)) will be notified of this update also.

As a specific example, at runtime, the system may automatically generate a post (e.g., post 1010) about the update (the user does not have to create post 1010) and add the post to the "CAMRY-Exchange" object's activity stream, as shown in FIG. 10, and also to the activity stream of the "David Davis" object. Anyone (e.g., followers 1020) who is following the "CAMRY-Exchange" object will get a notification (via email, message, etc.) right away that the activity stream of the "CAMRY-Exchange" object (that they are following) has been updated. Likewise, anyone who is following the "David Davis" object will get a notification right away that the activity stream of the "David Davis" object has been updated. They can then view and/or comment on the update if they so choose. In one embodiment, a user can configure what type of change (e.g., an administrative change to the object such as adding an administrator to the object versus a state change of the object such as changing to "resolved") that they want to receive and when they want to receive it.

In this disclosure, every object has an associated activity stream that utilizes an interface similar to one depicted in FIG. 10. An activity stream can include messages (e.g., post 1010 shown in FIG. 10), notifications of events, or other relevant information that is communicated between users or generated by the system. The activity stream is displayed in a window within a user interface of a configuration management system (e.g., activity stream tab 830 in user interface 899). The activity stream enables communication to and among stakeholders in relation to particular IT objects (e.g., in the context of a specific problem to be solved), and enables the sharing of relevant information with interested stakeholders while at the same time eliminating extraneous "noise" or unrelated discussions. Although every object has an owner who is responsible for that object, other stakeholders are allowed and encouraged to contribute information to the object, thereby increasing the amount of information available for each object, while at the same time reducing the administrative burden on the owner. This ensures that the right people (interested users) are effectively communicating about each object, enabling them to make faster and more informed decisions. The system automatically maintains a record of the activity stream for each object so that information relevant to any given object is available reference at any time.

Although conventional CMDBs enable the definition of IT objects and the relationships between these objects, CMDBs are, as noted above, typically very formal. IT objects and their relationships are therefore defined according to specific predetermined attributes and characteristics that do not include many types of useful collateral information. If this collateral information is encountered after definition of the CMDB, there may be no effective way of capturing and utilizing the information. The CMDB is often simply created and populated with the specific types of information that it was designed to store. Even if the CMDB is well designed, the responsibility of maintaining it often lies with IT staff who may not have the time, the interest, or even the specific knowledge necessary to complete, maintain or update the stored information. As a result, the stored information frequently begins almost immediately to age and become stale, untrustworthy, and of decreasing value.

The IT management solution disclosed herein, on the other hand, employs social objects and social methodologies to provide a more flexible, more easily maintained, and more useful collection of information. More specifically, the system may, for example: enable additional collateral information which typically is not stored in a CMDB to be related to each IT object; enable collaboration between many interested users to build and maintain information on the IT environment; and capture information on non-conventional IT objects (e.g., locations, people, policies, etc.). Thus, while data may be initially entered in a manner similar to that in which a CMDB is initially populated, or imported from an earlier (e.g., CMDB) system, the data may be easily expanded, updated, maintained and utilized by an large user-base, rather than only a limited IT staff.

The system provides a means for an owner of an IT object to determine important factors that may have an impact on the particular IT object. These impact factors may be accessible via an impact factors tab in a user interface of the system (e.g., impact factors 860 of user interface 899 shown in FIG. 8 (divided into FIGS. 8A-8D)). Referring to FIGS. 11A-F, such impact factors may be organized into several categorical menu items (or sets of impact factors) 1110, including policies 1112, knowledge 1114, key settings 1116, management applications 1117, automation 1118, fragile information 1119, etc. An impact factor specific to the IT object of interest may be added or removed (e.g., via buttons 1120, 1122, 1130, 1132, 1140, 150, 1152, 1160, and 1162). For example, referring to FIG. 11B, an owner of an IT object may list five articles that are important to the IT object. Any time a user has an issue with the IT object, the user can navigate to the impact factors of the IT object and review what is listed under "knowledge" associated with that IT object. In this way, each "set" of impact factors (in this case, in the "knowledge" category) essentially takes a subset of the graphical, topographical view of the object relationship diagram. While the graphical view can give a quick view (visualization) of what is related to a particular IT object and how they are related, the impact factors allow someone like an IT professional to go directly to the knowledge specific to the IT object and figure out what questions are important to ask. Likewise, policies 1112 may provide information and links to policies applicable to the IT object; key settings 1116 may capture important exceptions for the IT object not documented anywhere else; management applications 1117 may list and link to any external management application that is monitoring the IT object; automation 1118 may list and link to any script that the IT object consumes; and fragile information 1119 may provide information on what may break the IT object. As such, the system federates information from different systems and provides links for quick access to those systems.

Review of impact factors of one IT object may be part of an impact analysis relative to another IT object. For example, referring to FIGS. 12A and 12B, which depicts a diagrammatic representation of an example user interface showing a view of an impact analysis 1250 for IT object 1201. In this case, IT object 1201 is of a change object type. As discussed above, a change object (referred to hereinafter as a "change") is used to manage a change to other IT objects. In this example, impact analysis diagram 1242 shows that change 1201 is related to IT object 801 "CAMRY-Exchange" and that IT object 801 is in multiple perspectives 1280. When change 1201 is first created, the system may operate to evaluate IT object 801, evaluate its associated object relationships, and determine what activity streams need to be updated (e.g., all relevant impacts) by following the relationships of each IT object involved. Since perspectives are IT objects themselves, this process includes perspectives 1280 and objects contained therein. For example, even if user A is not directly following IT object 801, if user A follows an IT object (say, an exchange server machine) that depends on IT object 801, an update is posted to the activity stream of the IT object representing the exchange server machine, and since user A follows the exchange server machine, user A now has notice that a change has made to the exchange application (IT object 801) and that may have an impact on the exchange server machine.

Perspectives 1280 may be created using a perspective management module or system (e.g., perspective management 360 of FIG. 3). Each of perspectives 1280 defines a set of IT objects and provides a mechanism for bringing many object relationships into a personalized view. In evaluating change 1201, therefore, the system may follow the set of IT objects in each of perspectives 1280, evaluate the associated object relationships, and automatically update the activity streams accordingly. Aspects and examples of an example perspective management system are described in the above-referenced U.S. patent application Ser. No. 13/929,466, filed concurrently herewith, entitled, "SYSTEMS AND METHODS FOR IT SERVICES AND SOCIAL KNOWLEDGE MANAGEMENT USING PERSPECTIVES," which is incorporated herein by reference.

Figure 13:
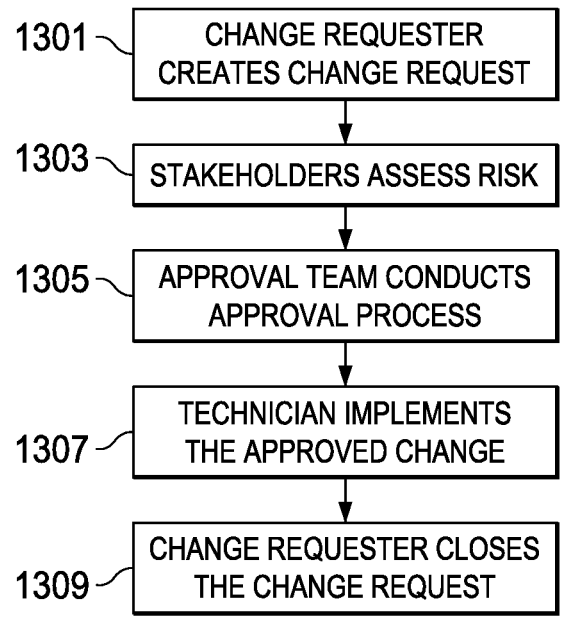
FIG. 13 depicts an example flow diagram of a method for managing a change.

FIG. 13 depicts an example flow diagram of a method for managing a change. At step 1301, a user (referred to as a change requester) may create a change request via a change management module or system (e.g., change management 362 of FIG. 3). Suppose the requested change is related to an exchange application. Each stakeholder such as the owner of the exchange application may perform an impact analysis and review impact factors of the exchange application to assess the risk posed by the requested change (step 1303). If the stakeholders find the risk acceptable, an approval team may conduct an approval process (step 1305) and cause the approved change to be implemented (step 1307). After the change is made, the change requester may then close the change request (step 1309).

Figure 14A:
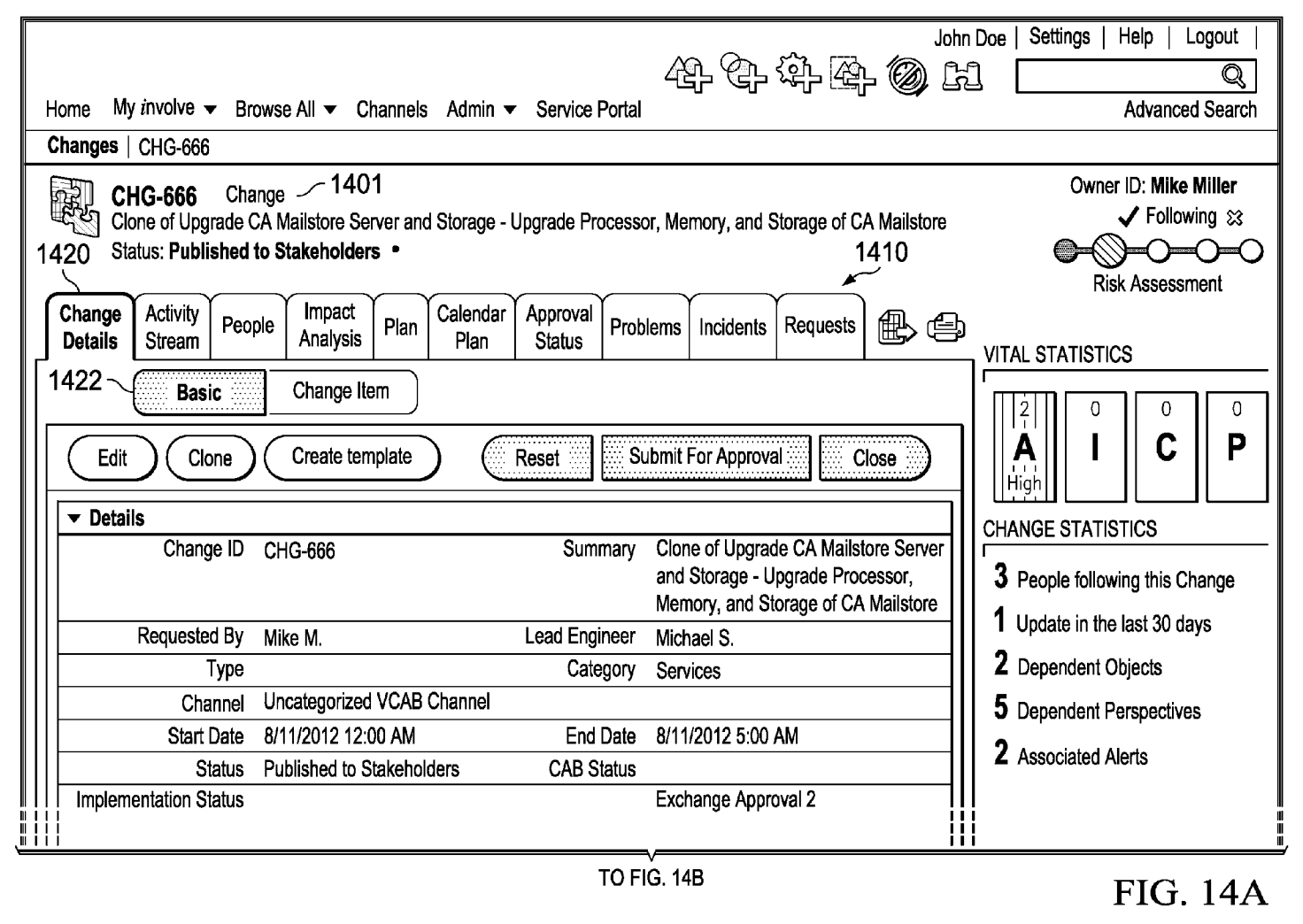
Figure 14E:

FIGS. 14A-14B depict a diagrammatic representation of example user interface 1499 for a change management system, showing under change details tab 1420 basic object attributes 1422 for IT object 1401 which is of a change object type. In this example, user interface 1499 may operate to present a plurality of tabs 1410 for change 1401. As illustrated by FIGS. 8A-8D and 14A-14H, different object types in the system may be supported by different sets of functions.

FIGS. 14C-14D depict a diagrammatic representation of example user interface 1499 showing change item 1424 under change details tab 1420. Notice that a change record (e.g., record 1426) can have more than one change items. In this case, one of them is change item 4128 "Upgrade Memory" having target object 1501.

FIGS. 14E-14F show that a stakeholder "Rob Robert" under people tab 1440 has accepted the risk associated with change 1401 after looking at the impact of this change to his perspective of IT objects. Upon receiving his update, the system automatically generates a post about the update and posts it in the activity stream of change 1401, as seen under activity stream tab 1430 shown in FIG. 14G.

Figure 14H:
Figure 15:
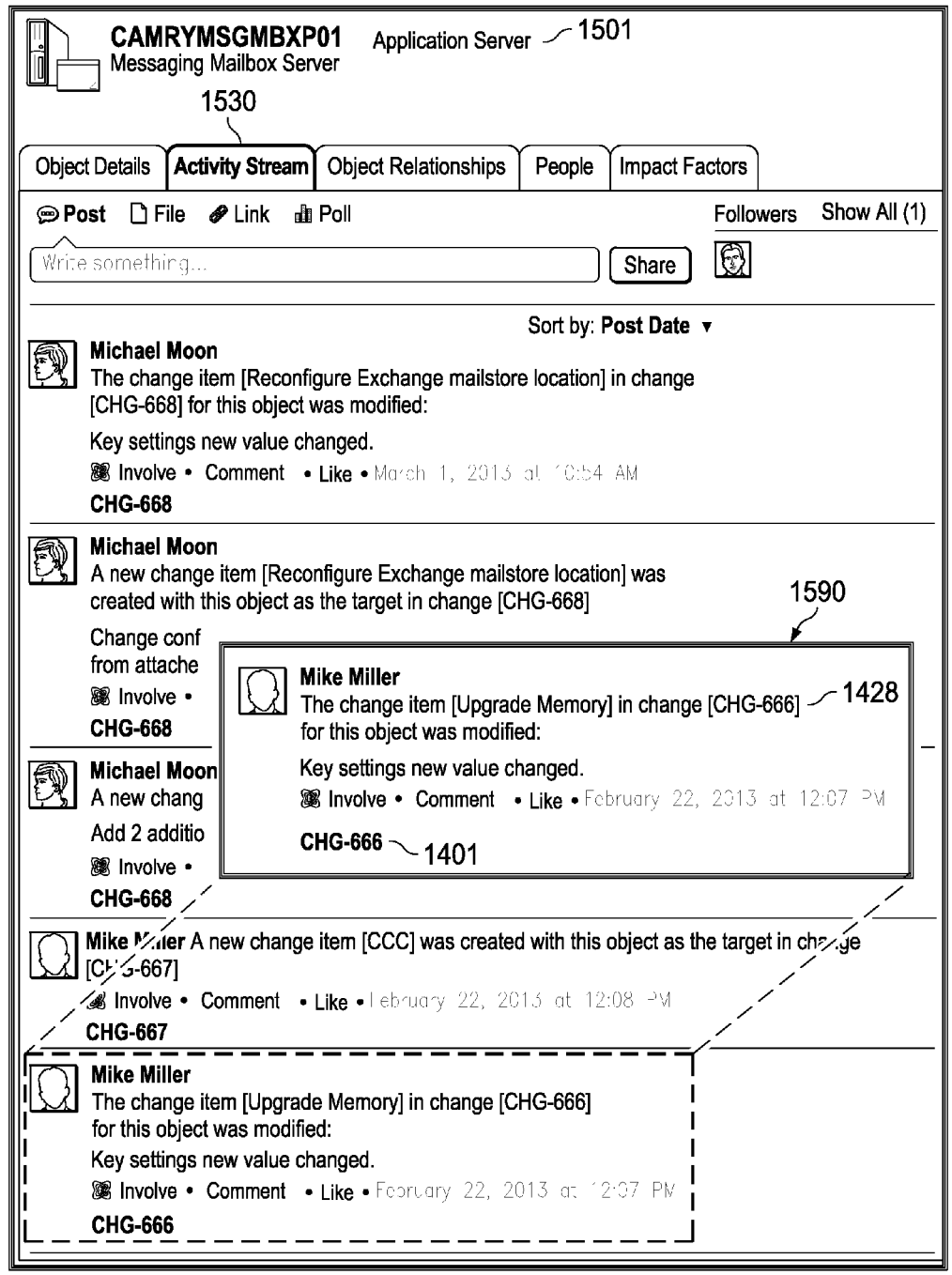
FIG. 15 depicts a diagrammatic representation of an example user interface configured for a server object type.

FIG. 14H depicts a diagrammatic representation of another example of activity stream tab 1430 for change 1401 showing post 1490 that was automatically generated by the system to reflect a modification by "Mike Miller" to change item 1428 and its associated target object 1501. FIG. 15 depicts a diagrammatic representation of an example of activity stream tab 1530 for target object 1501 showing post 1590 that was simultaneously automatically generated by the system to reflect the same modification by "Mike Miller" to change item 1428 of change 1401.

Any change in an IT environment could impact other systems in the IT environment. Change management is a process by which because of an incident, a problem or request, a change to the IT environment is needed and needs to be carefully managed and executed operationally. A significant amount (e.g., about 80% or more) of incidents in an IT environment can be caused by changes (e.g., a change to an application running in the IT environment, adding a new server machine, removing a user, etc.). To this end, change management provides an organization with an ability to manage changes in an IT environment, including how a configuration change or a change to an application is to be applied to minimize impact caused by such a change.

Figure 16:
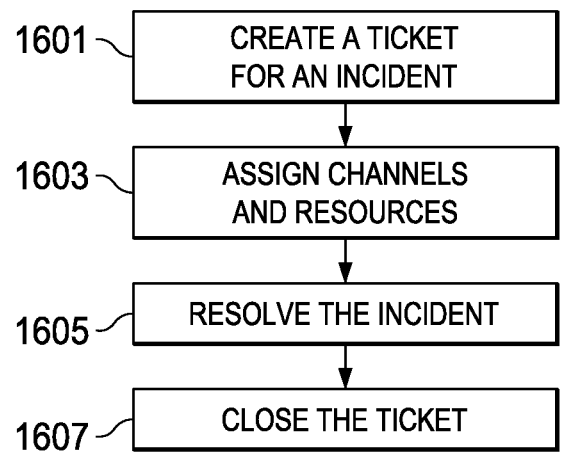
FIG. 16 depicts a flow diagram illustrating an example method for managing an incident.

FIG. 16 depicts a flow diagram illustrating an example method for managing an incident. Specifically, a ticket may be created for an incident (step 1601). Channel(s) and resource(s) may then be assigned to the incident (step 1603). As described below, channel members are mandated to collaborate and resolve the incident (step 1605). After the incident is resolved, the ticket is then closed (step 1607).

FIGS. 17A-17B depict a diagrammatic representation of an example of user interface 1799 with tabs 1710 including activity stream 1730 for incident 1701. In this case, function 1770 is provided within activity stream 1730, allowing viewers to involve other processes (via "Attach Involved Link" 1772) in resolving incident 1701 and/or promote (via "Promote to Knowledge" function 1774) the topic as knowledge for incident 1701. The activity stream of a channel can echo the activity stream of an incident and reflect the changing status of the incident as it is being managed and resolved. Aspects and examples of channels and incident management are described in the above-referenced U.S. patent application Ser. No. 13/753,799, filed Jan. 30, 2013, entitled "SYSTEMS AND METHODS FOR IT SERVICES AND SOCIAL KNOWLEDGE MANAGEMENT USING CHANNELS," which is incorporated herein by reference.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist, touch pad, etc.), or the like.

ROM, RAM, and HD are computer memories for storing computer-executable instructions executable by the CPU or capable of being complied or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used, individually or in conjunction with another programming language, to implement the routines, methods or programs of embodiments of the invention described herein, including C, C++, Java, JavaScript, HTML, or any other programming or scripting language, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method for information technology (IT) services and social knowledge management, comprising:
   providing IT objects in an IT environment, the providing performed by an IT services and social knowledge management system embodied on one or more server machines operating in the IT environment, the IT services and social knowledge management system comprising an activity stream manager and a user interface, wherein:
 each physical or non-physical object in the IT environment is represented by an IT object;
 each IT object in the IT environment has a one-to-one relationship with an associated activity stream; and
 the associated activity stream is instantiated when each IT object was created; continuously monitoring the activity streams of the IT objects in the IT environment;
detecting, by the activity stream manager, a change to a first IT object of the IT objects in the IT environment, wherein:
 the first IT object has a first activity stream;
 the first IT object has a one-to-one relationship with the first activity stream;
 the first activity stream is instantiated from a predefined class;
 the predefined class has a set of attributes;
 the first activity stream is instantiated when the first IT object was created; and
 the first activity stream is configured for capturing communications, notifications, and knowledge related to the first IT object;
automatically generating, by the activity stream manager, a first post, topic, or comment about the change to the first IT object;
dynamically updating the first activity stream of the first IT object by placing the first post, topic, or comment about the change to the first IT object in the first activity stream of the first IT object;
determining, by the activity stream manager, a second IT object affected by the change to the first IT object, wherein:
 the second IT object has a second activity stream;
 the second IT object has a relationship with the first IT object;
 the relationship between the first IT object and the second IT object is user-defined or dynamically defined;
 the user interface of the IT services and social knowledge management system is configured for displaying a visualization of the first IT object, when selected, at a center of a diagram or layout on the user interface; and
 the visualization of the first IT object at the center of the diagram or layout on the user interface is connected to a visualization of the second IT object via a link representing the relationship between the first IT object and the second IT object; and
responsive to the determining that the second IT object is affected by the change to the first IT object, dynamically updating, by the activity steam manager, the second activity stream of the second IT object to include a second post, topic, or comment about the change to the first IT object, the second activity stream being provided over a network to a client device communicatively connected to the one or more server machines over the network.

2. The method according to claim 1, further comprising:
automatically generating the second post, topic, or comment about the change to the first IT object.

3. The method according to claim 1, further comprising:
creating a third IT object;
relating the third IT object to the first IT object;
automatically generating a third post, topic, or comment about the third IT object being related to the first IT object; and
placing the third post, topic, or comment about the third IT object being related to the first IT object in the first activity stream of the first IT object.

4. The method according to claim 1, wherein the user interface of the IT services and social knowledge management system is further configured for:
allowing multiple users in the IT environment to post comments in the first activity stream of the first IT object about the change to the first IT object.

5. The method according to claim 1, wherein the diagram or layout on the user interface provides at least a topographical view of the first IT object, the second IT object, and their relationship, and wherein the dynamically updating comprises updating the topographical view to provide a real-time view of the relationship between the first IT object and the second IT object.

6. The method according to claim 1, further comprising:
promoting the second post, topic, or comment about the change to the first IT object as knowledge for the second IT object and persisting the knowledge in a knowledge base accessible by the IT services and social knowledge management system.

7. A computer program product for information technology (IT) services and social knowledge management, the computer program product comprising at least one non-transitory computer readable medium storing instructions translatable by an IT services and social knowledge management system embodied on one or more server machines for:
providing IT objects in an IT environment, wherein:
 each physical or non-physical object in the IT environment is represented by an IT object;
 each IT object in the IT environment has a one-to-one relationship with an associated activity stream; and
 the associated activity stream is instantiated when each IT object was created;
continuously monitoring the activity streams of the IT objects in the IT environment;
detecting a change to a first IT object of the IT objects in the IT environment, wherein:
 the first IT object has a first activity stream;
 the first IT object has a one-to-one relationship with the first activity stream;
 the first activity stream is instantiated from a predefined class;
 the predefined class has a set of attributes;
 the first activity stream is instantiated when the first IT object was created; and
 the first activity stream is configured for capturing communications, notifications, and knowledge related to the first IT object;
automatically generating a post, topic, or comment about the change to the first IT object;
dynamically updating the first activity stream of the first IT object by placing the post, topic, or comment about the change to the first IT object in the first activity stream of the first IT object;
determining a second IT object affected by the change to the first IT object, wherein:
 the second IT object has a second activity stream;
 the second IT object has a relationship with the first IT object;

the relationship between the first IT object and the second IT object is user-defined or dynamically defined;

the IT services and social knowledge management system comprises a user interface configured for displaying a visualization of the first IT object, when selected, at a center of a diagram or layout on the user interface; and the visualization of the first IT object at the center of the diagram or layout on the user interface is connected to a visualization of the second IT object via a link representing the relationship between the first IT object and the second IT object; and responsive to the determining that the second IT object is affected by the change to the first IT object, dynamically updating the second activity stream of the second IT object to include a second post, topic, or comment about the change to the first IT object, the second activity stream being provided over a network to a client device communicatively connected to the one or more server machines over the network.

8. The computer program product of claim 7, wherein the instructions are further translatable by the IT services and social knowledge management system embodied on the one or more server machines for:

automatically generating the second post, topic, or comment about the change to the first IT object.

9. The computer program product of claim 7, wherein the instructions are further translatable by the IT services and social knowledge management system embodied on the one or more server machines for:

instantiating a third IT object;

relating the third IT object to the first IT object;

automatically generating a third post, topic, or comment about the third IT object being related to the first IT object; and placing the third post, topic, or comment about the third IT object being related to the first IT object in the first activity stream of the first IT object.

10. The computer program product of claim 7, wherein the user interface of the IT services and social knowledge management system is further configured for allowing multiple users in the IT environment to post comments in the first activity stream of the first IT object about the change to the first IT object.

11. The computer program product of claim 7, wherein the user interface of the IT services and social knowledge management system is further configured for presenting at least a topographical view of the first IT object, the second IT object, and their relationship, and wherein the dynamically updating comprises updating the topographical view to provide a real-time view of the relationship between the first IT object and the second IT object.

12. The computer program product of claim 7, wherein the instructions are further translatable by the IT services and social knowledge management system embodied on the one or more server machines for:

promoting the second post, topic, or comment about the change to the first IT object as knowledge for the second IT object and persisting the knowledge in a knowledge base accessible by the IT services and social knowledge management system.

13. A system for information technology (IT) services and social knowledge management in an IT environment, comprising:

a data storage device storing IT objects representing physical and non-physical objects in the IT environment, with each IT object of the IT objects representing one of the physical and non-physical objects in the IT environment, the physical objects including animate and non-animate objects, each IT object of the IT objects having a one-to-one relationship with an associated activity stream, the associated activity stream instantiated when each IT object was created; and one or more server machines communicatively connected to the data storage device, the one or more server machines executing an activity stream manager configured for:

continuously monitoring the activity streams of the IT objects in the IT environment;

detecting a change to a first IT object, wherein:
the first IT object is one of the IT objects and has a first activity stream;
the first IT object has a one-to-one relationship with the first activity stream;
the first activity stream is instantiated from a predefined class;
the predefined class has a set of attributes;
the first activity stream is instantiated when the first IT object was created; and
the first activity stream is configured for capturing communications, notifications, and knowledge related to the first IT object;

automatically generating a post, topic, or comment about the change to the first IT object;

dynamically updating the first activity stream of the first IT object by placing the post, topic, or comment about the change to the first IT object in the first activity stream of the first IT object;

determining a second IT object affected by the change to the first IT object, wherein:
the second IT object has a second activity stream;
the second IT object has a relationship with the first IT object;
the relationship between the first IT object and the second IT object is user-defined or dynamically defined;
the system further comprises a user interface configured for displaying a visualization of the first IT object, when selected, at a center of a diagram or layout on the user interface; and
the visualization of the first IT object at the center of the diagram or layout on the user interface is connected to a visualization of the second IT object via a link representing the relationship between the first IT object and the second IT object; and responsive to the determining that the second IT object is affected by the change to the first IT object, dynamically updating the second activity stream of the second IT object to include a second post, topic, or comment about the change to the first IT object.

14. The system of claim 13, wherein the user interface is further configured for:

allowing multiple users in the IT environment to post comments in the first activity stream of the first IT object about the change to the first IT object.

15. The system of claim 13, wherein the user interface is further configured for providing at least a topographical view of the first IT object, the second IT object, and their relationship, and wherein the dynamically updating comprises updating the topographical view to provide a real-time view of the relationship between the first IT object and the second IT object.

16. The system of claim 13, further comprising:
a client device communicatively connected to the one or more server machines, the client device executing a user interface configured for facilitating user interaction with the first activity stream.

17. The system of claim 13, further comprising:
a client device communicatively connected to the one or more server machines, the client device executing a user interface configured for creation, configuration, and management of the first IT object.

18. The system of claim 13, wherein the first IT object and the second IT object are of different object types.

19. The system of claim 13, wherein the first IT object represents knowledge promoted from a third activity stream of a third IT object.

20. The system of claim 13, wherein the change to the first IT object represents creation of a relationship object relating the first IT object to a third IT object of a change object type.

\* \* \* \* \*